US008125679B2

(12) United States Patent
Dai et al.

(10) Patent No.: US 8,125,679 B2
(45) Date of Patent: Feb. 28, 2012

(54) IMAGE PROCESSING METHOD AND IMAGE PROCESSING APPARATUS

(75) Inventors: Xiaoyan Dai, Yokohama (JP); Hidefumi Osawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/211,494

(22) Filed: Aug. 17, 2011

(65) Prior Publication Data
US 2011/0299145 A1   Dec. 8, 2011

Related U.S. Application Data

(60) Continuation of application No. 13/014,475, filed on Jan. 26, 2011, now Pat. No. 8,023,147, which is a division of application No. 11/692,317, filed on Mar. 28, 2007, now Pat. No. 7,903,307.

(30) Foreign Application Priority Data
Mar. 30, 2006   (JP) .................................. 2006-095840

(51) Int. Cl.
G06K 15/00 (2006.01)
G06K 9/34 (2006.01)
H04N 1/46 (2006.01)

(52) U.S. Cl. ....................... 358/1.18; 358/1.16; 358/1.17
(58) Field of Classification Search ........................ None
See application file for complete search history.

(56) References Cited

U.S. PATENT DOCUMENTS
2003/0123087 A1*  7/2003  Sakai et al. .................... 358/1.15
2007/0030527 A1*  2/2007  Fuchigami ..................... 358/448
* cited by examiner Primary Examiner — James A Thompson
(74) Attorney, Agent, or Firm — Cowan, Liebowitz & Latman, P.C.

(57) ABSTRACT

An image processing method and image processing apparatus which can execute vector conversion processing by appropriately dividing a clipart image including gradation into regions are provided. To this end, a color document image including a clipart image having an area of gradation is input, the clipart image is selected, and outline information of the clipart image is extracted. The color document image is separated into an achromatic color area and a chromatic color area, which are respectively divided into a plurality of regions. Of the plurality of regions of each of the achromatic color area and the chromatic color area divided in the dividing of region step, regions which meet a set condition are integrated. After that, the clipart image is converted into vector data using a region group after integrating of region and the outline information.

14 Claims, 32 Drawing Sheets

F I G. 11
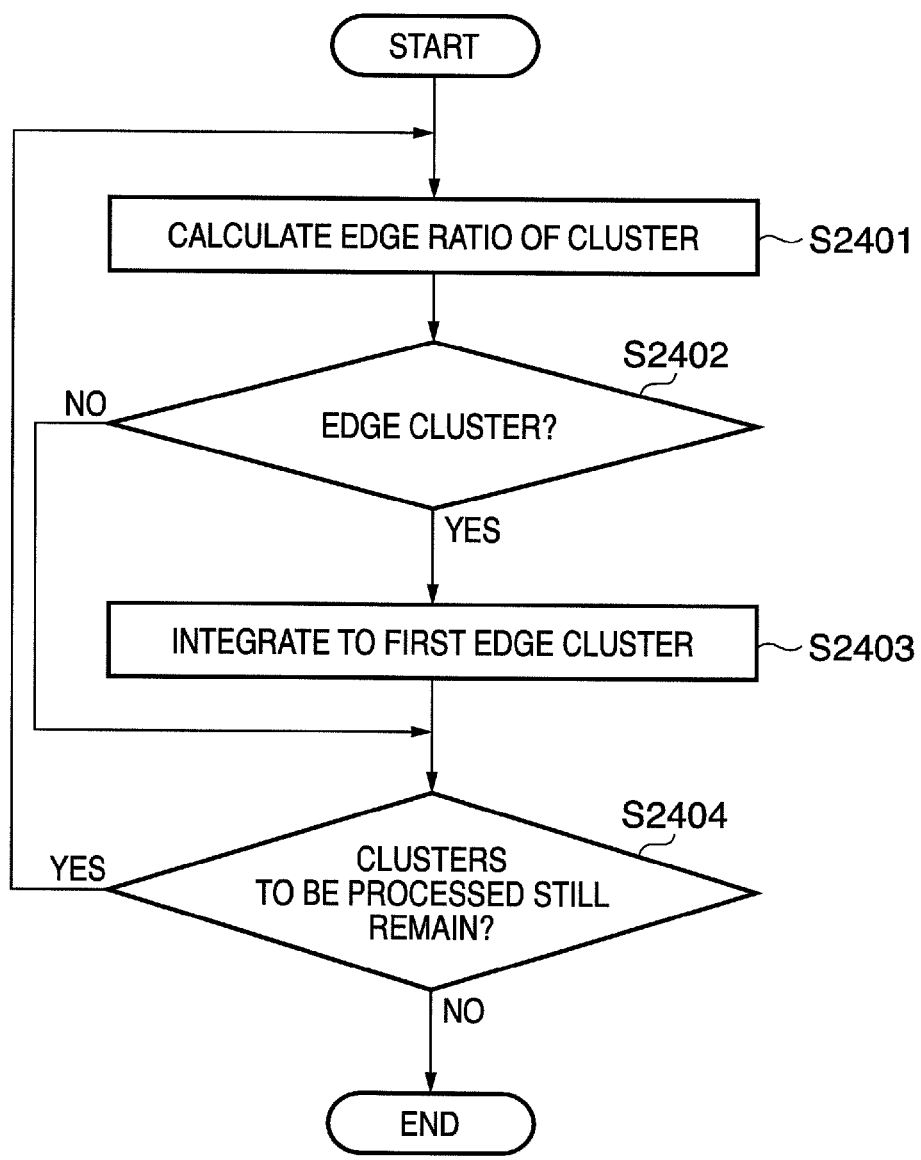

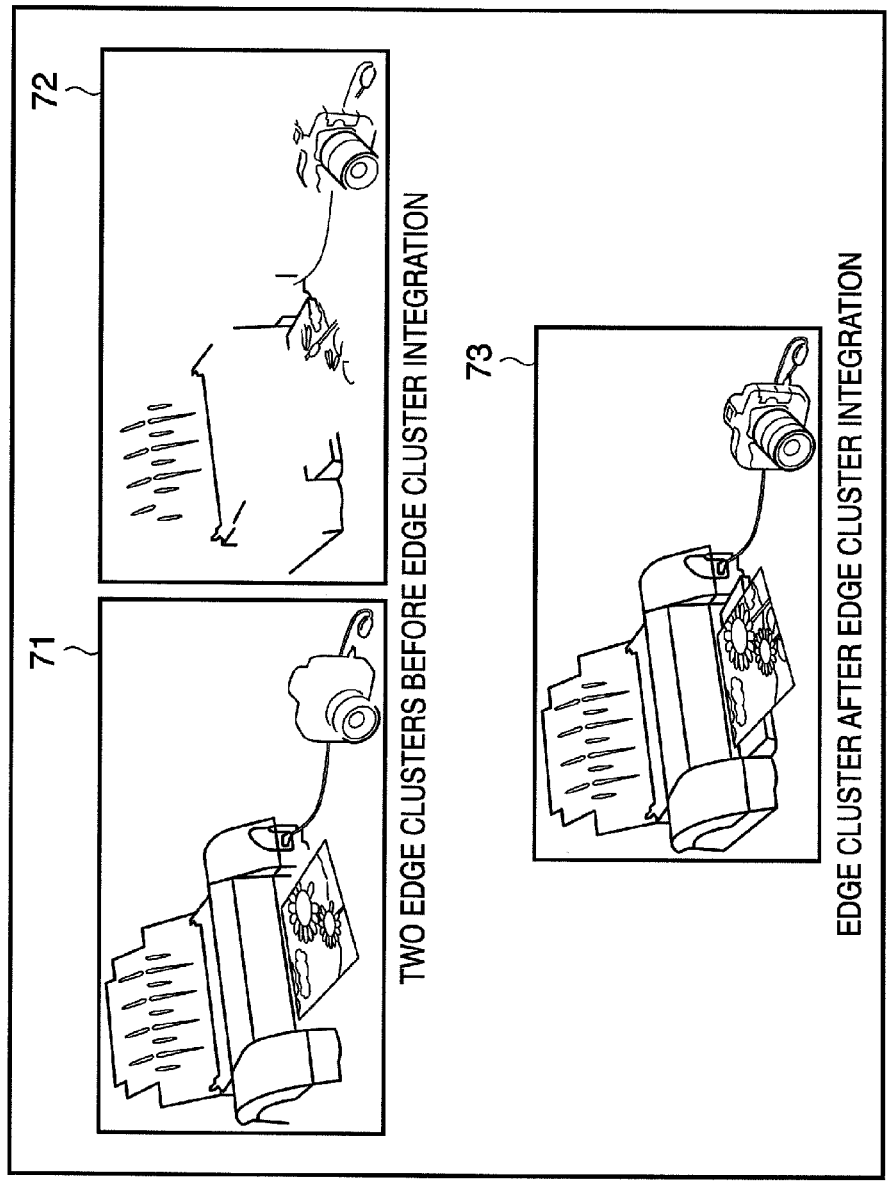

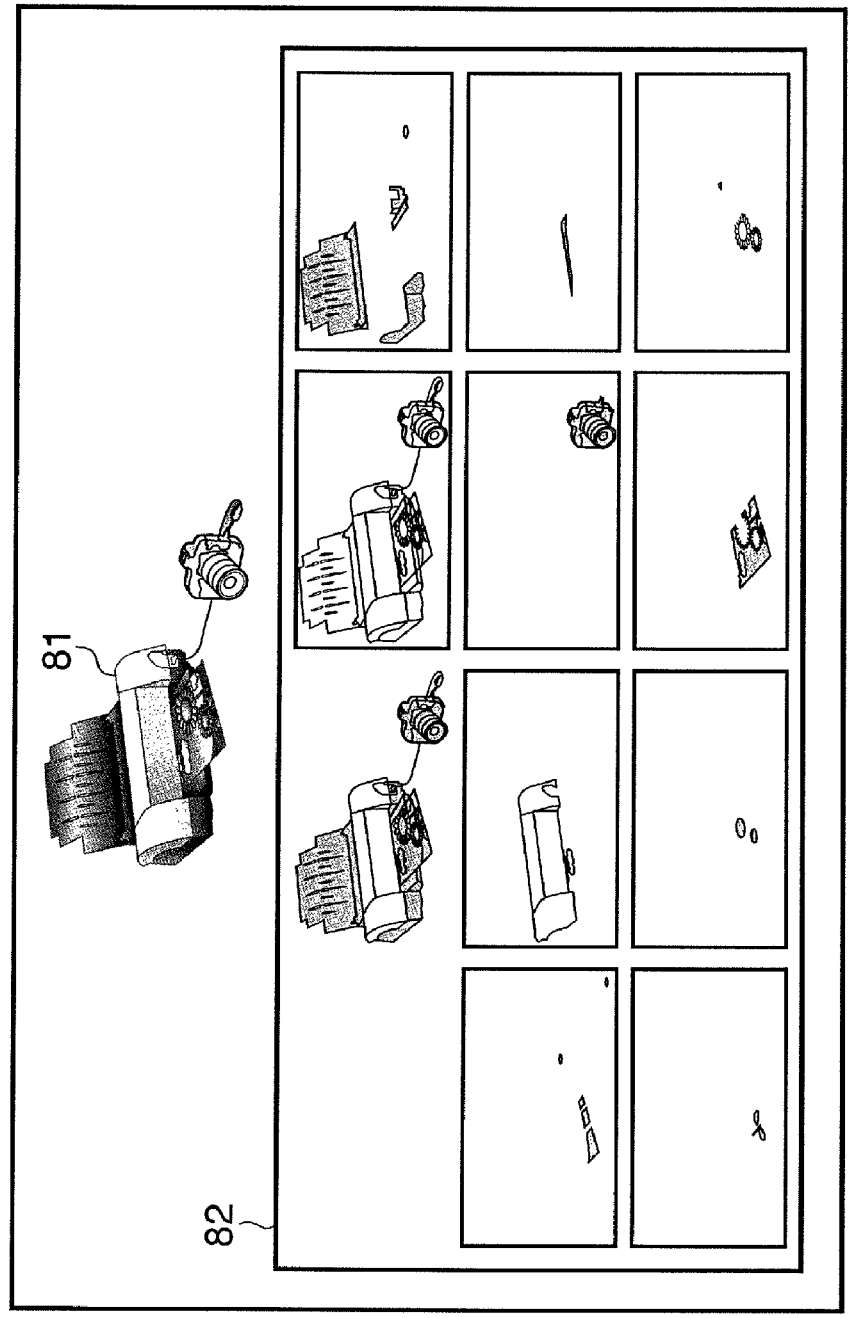

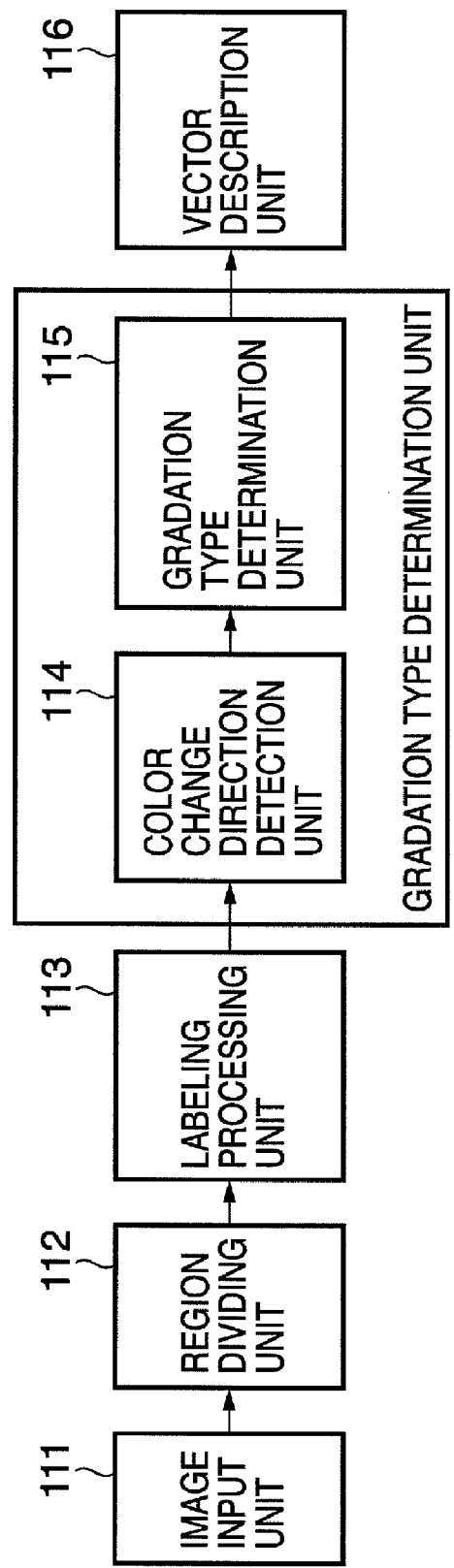

F I G. 16
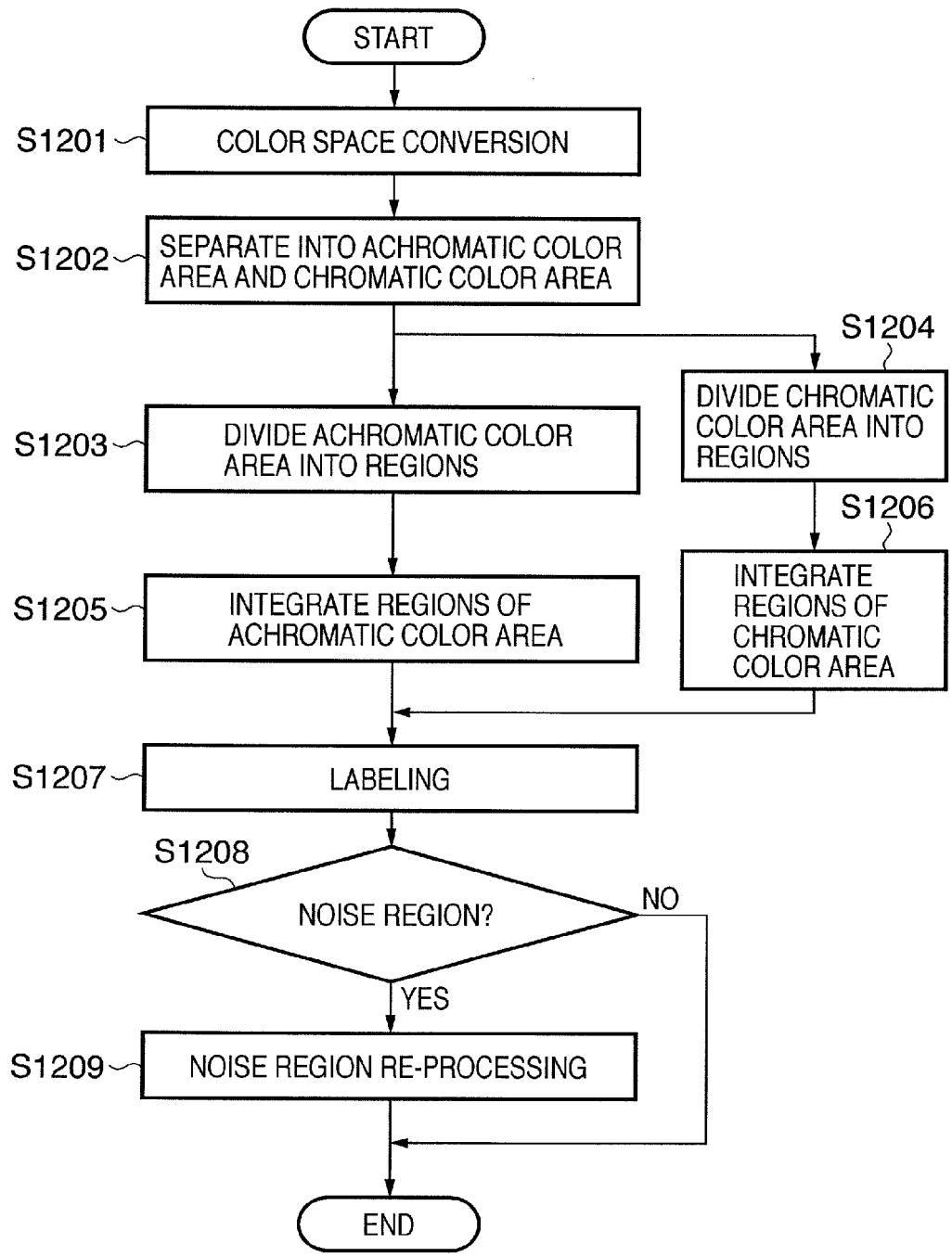

FIG. 18

| MASK PATTERN | (1) 1 1 1<br>1 −2 1<br>−1 −1 −1 | (2) 1 1 1<br>1 −2 1<br>−1 −1 1 | (3) 1 1 1<br>1 −2 1<br>1 −1 1 | (4) −1 −1 1<br>1 −2 1<br>1 1 1 | (5) −1 1 1<br>−1 −2 1<br>−1 1 1 | (6) 1 1 1<br>−1 −2 1<br>−1 −1 1 | (7) 1 1 1<br>1 −2 1<br>−1 −1 −1 | (8) 1 1 1<br>1 −2 −1<br>1 −1 −1 |
|---|---|---|---|---|---|---|---|---|
| CORRE-SPONDING EDGE | LIGHT\|DARK | | | | | | | |

FIG. 21

DESCRIPTION EXAMPLE OF LINEAR GRADATION :
```
<defs>
    <linearGradient id="linegradient1"
        x1="0%" y1="0%" x2="100%" y2="0%">
      <stop offset="0%" stop-color="#A"/>
      <stop offset="100%" stop-color="#B"/>
    </linearGradient>
</defs>
<path fill="url(#linegradient1)" d="...">
```

DESCRIPTION EXAMPLE OF RADIAL GRADATION :
```
<defs>
    <radialGradient id="radialgradient1">
      <stop offset="0%" stop-color="#A"/>
      <stop offset="100%" stop-color="#B"/>
    </radialGradient>
</defs>
<path fill="url(#radialgradient1)" d="...">
```

REGION DIVIDING RESULT 1      VECTOR CONVERSION RESULT 1
                              OF LINEAR GRADATION

F I G. 25
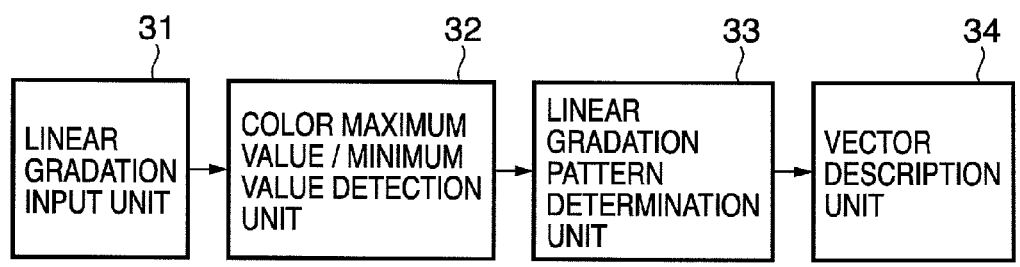

FIG. 27

DESCRIPTION EXAMPLE OF LINEAR GRADATION :
PATTERN 1 DARK→LIGHT
```
<defs>
    <linearGradient id="linegradient1"
        x1="0%" y1="0%" x2="100%" y2="0%">
        <stop offset="0%" stop-color="#A"/>
        <stop offset="100%" stop-color="#B"/>
    </linearGradient>
</defs>
<path fill="url(#linegradient1)" d="...">
```

DESCRIPTION EXAMPLE OF LINEAR GRADATION:
PATTERN 2 LIGHT→DARK→LIGHT
```
<defs>
    <linearGradient id="linegradient2"
        x1="0%" y1="0%" x2="100%" y2="0%">
        <stop offset="0%" stop-color="#C"/>
        <stop offset="50%" stop-color="#A"/>
        <stop offset="100%" stop-color="#B"/>
    </linearGradient>
</defs>
<path fill="url(#linegradient2)"d="...">
```

DESCRIPTION EXAMPLE OF LINEAR GRADATION:
PATTERN 3 DARK→LIGHT→DARK
```
<defs>
    <linearGradient id="linegradient3"
        x1="0%" y1="0%" x2="100%" y2="0%">
        <stop offset="0%" stop-color="#A"/>
        <stop offset="50%" stop-color="#B"/>
        <stop offset="100%" stop-color="#D"/>
    </linearGradient>
</defs>
<path fill="url(#linegradient3)" d="...">
```

DESCRIPTION EXAMPLE OF LINEAR GRADATION:
PATTERN 4 LIGHT→DARK→LIGHT→DARK
```
<defs>
    <linearGradient id="linegradient4"
        x1="0%" y1="0%" x2="100%" y2="0%">
        <stop offset="0%" stop-color="#C"/>
        <stop offset="25%" stop-color="#A"/>
        <stop offset="50%" stop-color="#B"/>
        <stop offset="100%" stop-color="#D"/>
    </linearGradient>
</defs>
<path fill="url(#linegradient3)" d="...">
```

IMAGE PROCESSING METHOD AND IMAGE PROCESSING APPARATUS

CROSS-REFERENCE TO RELATED APPLICATION

This application is a continuation of application Ser. No. 13/014,475, filed Jan. 26, 2011 now U.S. Pat. No. 8,023,147, which is divisional of application Ser. No. 11/692,317, filed Mar. 28, 2007, now U.S. Pat. No. 7,903,307, the entire disclosures of which are hereby incorporated by reference.

BACKGROUND OF THE INVENTION

1. Field of the Invention

The present invention relates to an image processing method and image processing apparatus, which divide an image obtained by scanning a paper manuscript into regions, and convert the image into vector data for respective divided regions.

2. Description of the Related Art

In recent years, along with the advance of digitization, a system which stores digital data obtained by converting paper documents and transmits the digital data to other apparatuses instead of holding the paper documents intact is prevailing. Documents to be converted into digital data include not only monochrome binarized images, but also digital documents such as full-color (multi-level) documents. Furthermore, digital documents to be converted are not limited to image data obtained by scanning paper documents using a scanner or the like. For example, digital documents include data converted into more advanced information (e.g., a document image is divided into regions, a region of text undergoes character recognition processing to be converted into a character code sequence, a region of a photographic image is converted into outline vector data, and so forth) (see Japanese Patent Laid-Open No. 2004-265384 (WO2004/068368)).

The aforementioned images to be vector-converted include those which are obtained by scanning an illustration or a manuscript created by graphics creation software although they are full-color images. These images are characterized in that they are clear since the outlines of objects are rimmed compared to natural images such as photographic images, and the number of colors of appearance is limited, and so forth. In the following description, such an image will be referred to as a "clipart image".

Conventionally, image vector conversion processing is executed as follows. An input full-color image is converted into a binarized image, outline data and central line data are extracted from the binarized image, and the obtained outline data and color information of an original image are converted into vector data. Also, a method of dividing an image into regions by using color features, and converting outline data and inner colors of the region dividing result into vector data is available.

Furthermore, conventionally, various kinds of image processing for images including a gradation have been examined. For example, an image processing apparatus, which is described in Japanese Patent Laid-Open No. 10-243250 (U.S. Pat. No. 6,128,407), detects an area of gradation from a color image, reproduces the detected area of gradation as gradation, and applies, to a flat color area, image processing suited to flat color, so that the color image falls within a color reproduction range. The apparatus calculates variance values of an LCH color space of a region so that the area of gradation is expressed by the same color, detects a larger region on the color space as gradation, and reproduces this area of gradation intact.

An image change detection apparatus described in Japanese Patent Laid-Open No. 2001-309373 (US Patent Pub. No. 2001/0033691) executes feature extraction by second-order differentiation of brightness signal values corresponding to a plurality of pixels in a horizontal line of those which form a still image, so as to detect an area of gradation in the still image. When the result obtained by second-order differentiation is zero, the apparatus detects that the area of gradation is included.

However, when a clipart image including gradation undergoes the aforementioned vector conversion based on outline extraction, a problem that the area of gradation may be divided into many regions, a problem that the area of gradation may be divided into inappropriate clusters, and the likearise. Also, even with the method based on region division, if an area of gradation is divided into one region, a problem that achromatic and chromatic color areas may be included in an identical cluster arises. These problems cause an increase in vector data size and deterioration of image quality of a vector image.

Furthermore, the conventional color reproduction processing and image change detection processing for an image including gradation merely pertain to the detection of an area of gradation.

SUMMARY OF THE INVENTION

The present invention has been made in consideration of the above situation, and has as its object to provide an image processing method and image processing apparatus, which can appropriately divide a clipart image including gradation into regions, and can apply vector conversion processing.

It is another object of the present invention to provide an image processing method and image processing apparatus which aim at high compression of an image by appropriately dividing an area of gradation into regions and describing the regions as vector data upon applying vector conversion processing to an image with gradation, and can reproduce the area of gradation in a state approximate to an original image.

To achieve the above objects, the present invention comprises the following arrangement.

According to one aspect of the present invention, an image processing method in an image processing apparatus for inputting a color document image including a clipart image having an area of gradation, and converting the clipart image into vector data, comprising: a selecting step of selecting the clipart image from the input color document image; an extracting step of extracting outline information of the clipart image; a separating step of separating the color document image into an achromatic color area and a chromatic color area; a dividing of region step of respectively dividing the achromatic color area and the chromatic color area into a plurality of regions; an integrating of region step of integrating regions which meet a set condition of the plurality of regions of each of the achromatic color area and the chromatic color area divided in the dividing of region step; and a converting step of converting the clipart image into vector data using region groups integrated in the integrating of region step and the outline information.

According to another aspect of the present invention, an image processing method in an image processing apparatus for inputting a document image including an image with gradation, and converting the image into vector data, comprising: a dividing of region step of dividing the image into regions; a labeling step of labeling the regions obtained by dividing the image; a gradation type determining step of determining gradation types of the labeled regions in the image; and a description step of describing the regions using a graphic language in accordance with the determined gradation types.

According to still another aspect of the present invention, an image processing apparatus for inputting a color document image including a clipart image having an area of gradation, and converting the clipart image into vector data, comprising: a selecting unit adapted to select the clipart image from the input color document image; an extracting unit adapted to extract outline information of the clipart image; a separating unit adapted to separate the color document image into an achromatic color area and a chromatic color area; a dividing of region unit adapted to respectively divide the achromatic color area and the chromatic color area into a plurality of regions; an integrating of region unit adapted to integrate regions which meet a set condition of the plurality of regions of each of the achromatic color area and the chromatic color area divided by the dividing of region unit; and a converting unit adapted to convert the clipart image into vector data using region groups integrated by the integrating of region unit and the outline information.

According to yet another aspect of the present invention, an image processing apparatus for inputting a document image including an image with gradation, and converting the image into vector data, comprising: a dividing of region unit adapted to divide the image into regions; a labeling unit adapted to label the regions obtained by dividing the image; a gradation type determining unit adapted to determine gradation types of the labeled regions in the image; and a description unit adapted to describe the regions using a graphic language in accordance with the determined gradation types.

According to the present invention, a clipart image including gradation can be appropriately divided into regions, and can undergo vector conversion processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flowchart for explaining details of edge cluster determination processing in step S24, and details of edge cluster integrating processing in step S25 in FIGS. 2A and 2B;

FIG. 12 shows an example in which a cluster is determined as an edge cluster from divided clusters and is integrated to an edge cluster according to the first embodiment of the present invention;

FIGS. 13A to 13C show an example of vector conversion based on region dividing of a clipart image according to the first embodiment of the present invention;

FIG. 14 is a block diagram showing the arrangement of an image processing apparatus which executes vector conversion processing of an image with gradation according to the second embodiment of the present invention;

FIG. 16 is a flowchart for explaining details of region dividing processing of an image with gradation according to the second embodiment of the present invention;

FIG. 18 shows eight types of masks corresponding to color change directions, i.e., edge directions in the second embodiment;

FIG. 21 is a view for explaining vector description processing in the second embodiment;

FIG. 25 is a block diagram showing the arrangement of an image processing apparatus which executes linear gradation determination processing according to the fourth embodiment of the present invention;

FIG. 27 shows an example of linear gradation description processing according to the fourth embodiment of the present invention.

DESCRIPTION OF THE EMBODIMENTS

Vector conversion processing of image data using an image processing apparatus according to one embodiment of the present invention will be described in detail hereinafter with reference to the accompanying drawings.

First Embodiment

<Apparatus Arrangement>

Figure 1:
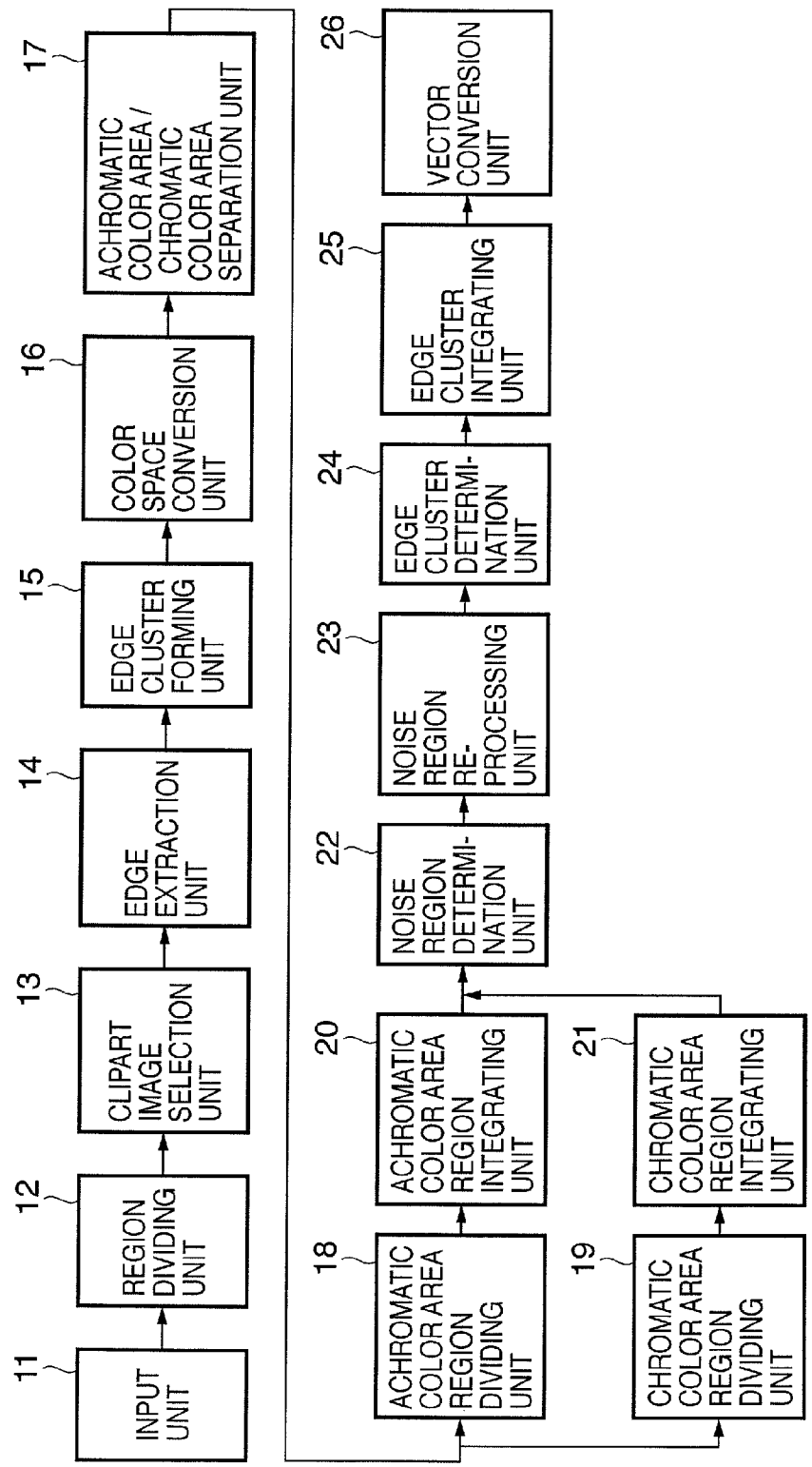
FIG. 1 is a block diagram showing the arrangement of an image processing apparatus having a function of executing vector conversion processing based on region dividing according to the first embodiment of the present invention.

FIG. 1 is a block diagram showing the arrangement of an image processing apparatus having a function of executing vector conversion processing based on region dividing according to the first embodiment of the present invention. Referring to FIG. 1, an input unit 11 inputs paper-based information as a color document image by scanning. A region dividing unit 12 divides the color document image into a plurality of types of regions including a photographic image region. Furthermore, a clipart image selection unit 13 selects a clipart image (e.g., an illustration or graphic image) from the divided regions. An edge extraction unit 14 extracts edges from the clipart image. An edge cluster forming unit 15 forms an edge cluster based on extracted edge information.

A color space conversion unit 16 converts an image from an RGB color space into an HSV color space. An achromatic color part/chromatic color part separation unit 17 separates an image into achromatic and chromatic color parts based on HSV color space information. An achromatic color part region dividing unit 18 divides an achromatic color part into regions. A chromatic color part region dividing unit 19 divides a chromatic color part into regions. An achromatic color part region integrating unit 20 integrates the regions of the achromatic color part. A chromatic color part region integrating unit 21 integrates the regions of the chromatic color part.

A noise region determination unit 22 determines a noise region from the divided regions. A noise region re-processing unit 23 applies re-processing to a region determined to be a noise region. An edge cluster determination unit 24 determines an edge cluster from the divided regions. An edge cluster integrating unit 25 integrates a cluster determined as an edge cluster into a pre-existing edge cluster. A vector conversion unit 26 converts the region dividing results into vector data.

Figure 28:
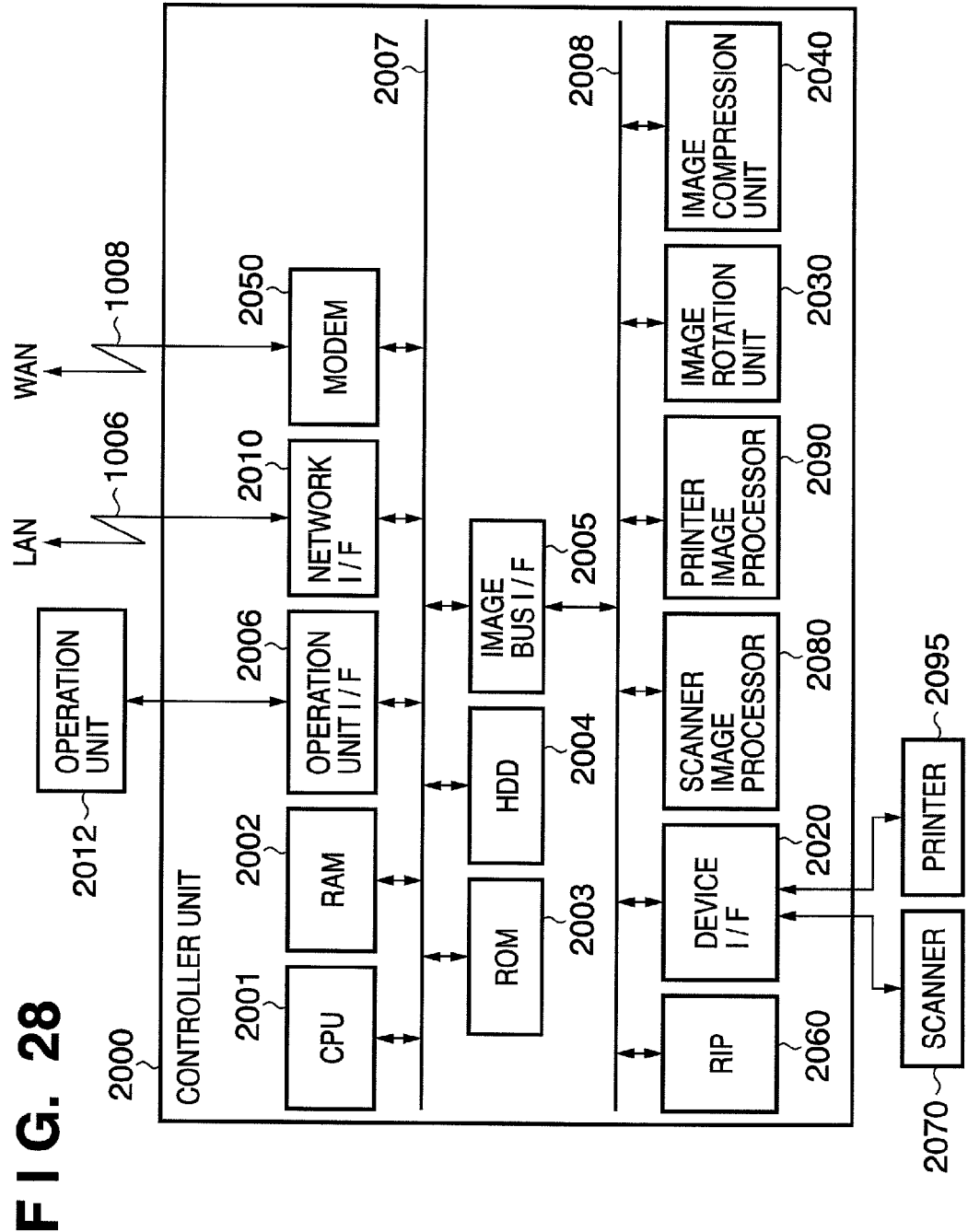
FIG. 28 is a block diagram showing the arrangement of principal parts of a digital multi function peripheral (MFP) as an embodiment which implements the image processing apparatus shown in FIG. 1.

FIG. 28 is a block diagram showing the arrangement of the principal components of a digital multi-function printer (MFP) as an embodiment which implements the image processing apparatus shown in FIG. 1. Note that the MFP used in this embodiment has, as an image processing apparatus, a scanner function and printer function. Alternatively, a system in which a general-purpose scanner is connected to a personal computer may be used as the image processing apparatus.

As shown in FIG. 28, the MFP comprises a controller unit 2000 which serves as an image processing apparatus. Connected to the controller unit 2000 is a scanner 2070 as an image input device and a printer 2095 as an image output device. The controller unit 2000 performs the device control required to implement a copy function comprising use of the printer 2095 to print image data, which has been scanned by the scanner 2070 from a manuscript image. The controller unit 2000 performs the device control required for exchanging pattern images, device information, and the like with another apparatus via a LAN 1006 or a public network (WAN) 1008.

As shown in FIG. 28, the controller unit 2000 has a CPU 2001. The CPU 2001 boots up an operating system (OS) using a boot program stored in a ROM 2003. The CPU 2001 implements various kinds of processing by executing application programs stored in an HDD (hard disk drive) 2004. A RAM 2002 is used as a work area of this CPU 2001. The RAM 2002 provides not only the work area of the CPU 2001 but also an image memory area that temporarily stores image data. The HDD 2004 stores image data together with the application programs.

The ROM 2003 and RAM 2002 are connected to the CPU 2001 via a system bus 2007. Furthermore, an operation unit I/F (operation unit interface) 2006, network I/F (network interface) 2010, modem 2050, and image bus I/F (image bus interface) 2005 are connected to the CPU 2001.

The operation unit I/F 2006 is an interface with an operation unit 2012 having a touch panel, and outputs to the operation unit 2012 image data to be displayed on the operation unit 2012. The operation unit I/F 2006 outputs, to the CPU 2001, information input by the user on the operation unit 2012.

The network I/F 2010 is connected to the LAN 2006 and exchanges information with apparatuses connected to the LAN 1006 via the LAN 1006. The modem 2050 is connected to the public network 1008, and exchanges information with other apparatuses via the public network 1008.

The image bus I/F 2005 is a bus bridge connecting the system bus 2007 and an image bus 2008, which transfers image data at high speed and converts the data structures. The image bus 2008 comprises a PCI or IEEE 1394 bus. A raster image processor (RIP) 2060, device I/F 2020, scanner image processor 2080, printer image processor 2090, image rotation unit 2030, thumbnail generation unit 2035, and image compression unit 2040 are connected to the image bus 2008.

The RIP 2060 is a processor which rasterizes PDL codes into a bitmap image. The scanner 2070 and printer 2095 are connected to the device I/F 2020, which converts the synchronous transfer/asynchronous transfer of image data. The scanner image processor 2080 applies image processing such as correction, modification, edit, and the like to the input image data. The printer image processor 2090 applies processing such as correction, resolution conversion, and the like of a printer to print output image data. The image rotation unit 2030 rotates image data. The image compression unit 2040 compresses multi-level image data, for example, into JPEG data, and binarized image data, for example, into data such as JBIG, MMR, MH, or the like, and executes their decompression processing.

<Overview of Vector Conversion Processing Based on Region Dividing>

Figure 2A:
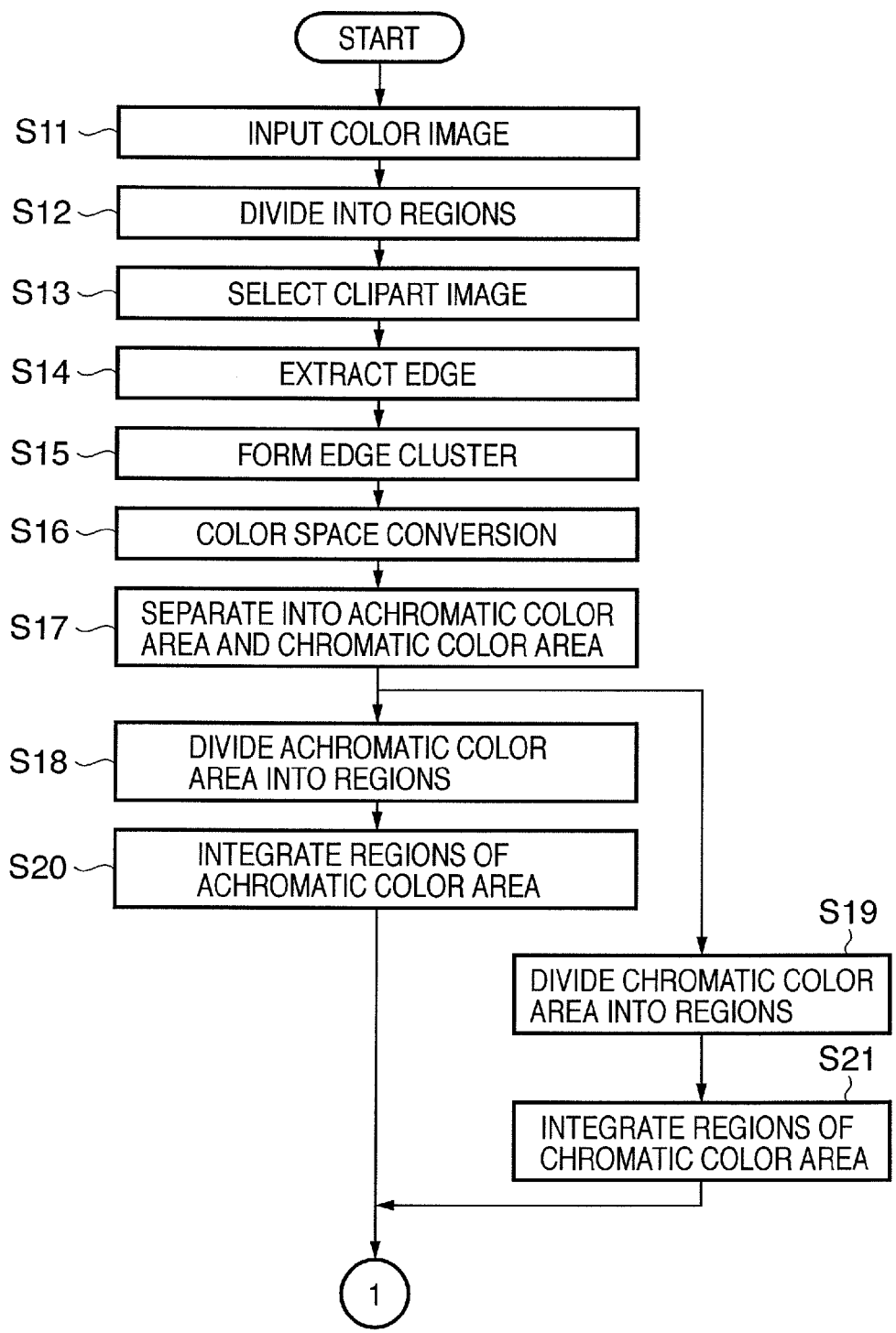
FIGS. 2A and 2B are flowcharts for explaining ah overview of the vector conversion processing based on region dividing of a clipart image according to the first embodiment of the present invention.
Figure 2B:
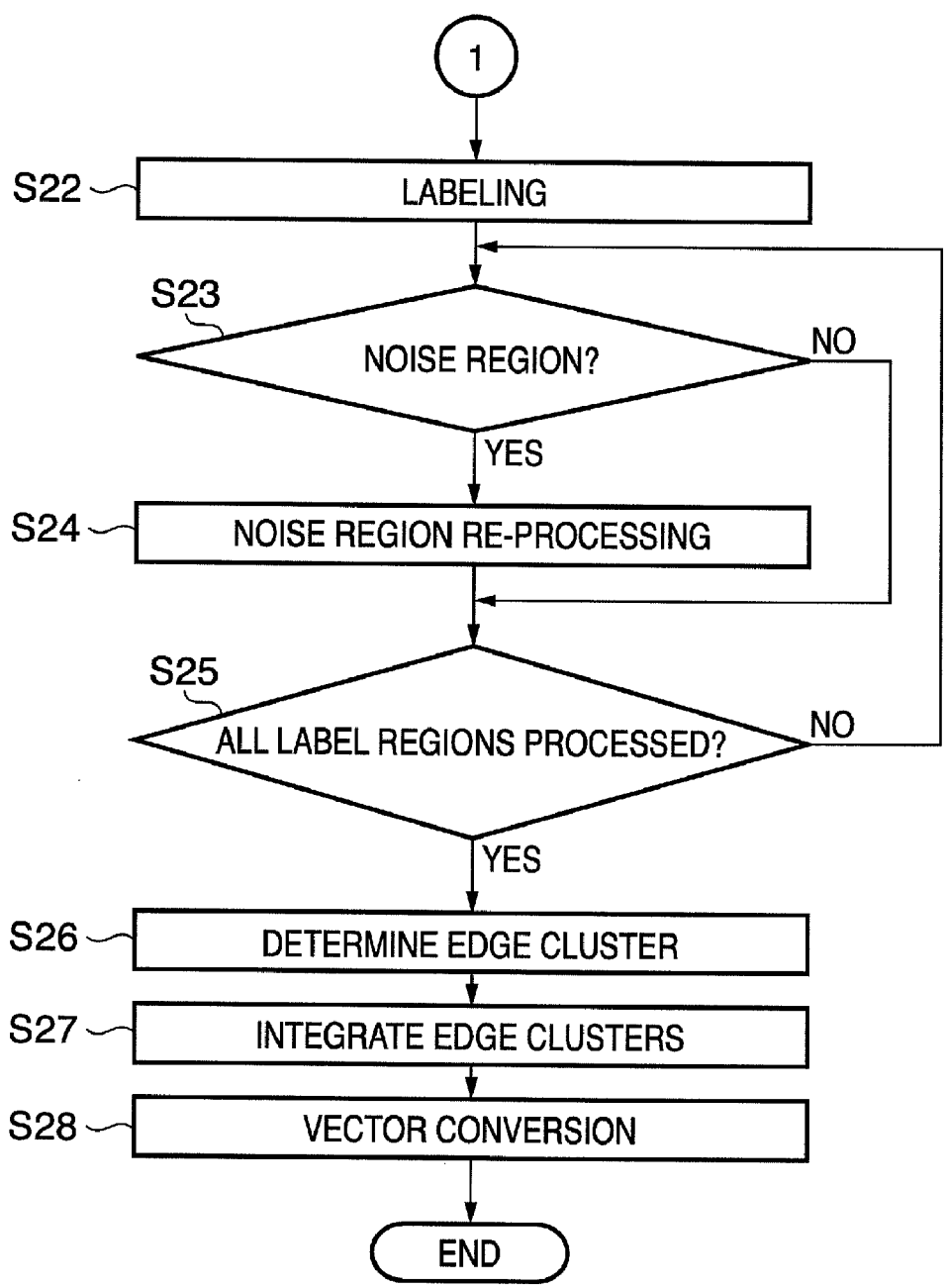

FIGS. 2A and 2B are flowcharts for providing an overview of vector conversion processing based on region dividing of a clipart image according to the first embodiment of the present invention.

The input unit 11 inputs paper information from the scanner and obtains color document image data (step S11). The region dividing unit 12 converts the input color document image into binary image data, and divides the binary image data into a plurality of types of regions such as text, photographic image, table, and the like (step S12). As an example that implements this region dividing processing, a region dividing technique described in U.S. Pat. No. 5,680,478 can be used. Note that this patent describes "Method and Apparatus for Character Recognition (Shin-YwanWang et al./

Canon K.K.)". Furthermore, the clipart image selection unit 13 selects a clipart image from the regions divided in the previous step (step S13).

The extraction unit 14 executes edge extraction processing (step S14). As an edge extraction method, a known Laplacian filter is used. The edge cluster forming unit 15 forms an edge cluster using pixels with high edge strengths (step S15). Details of this edge cluster forming processing will be described later.

The color space conversion unit 16 converts the image from an RGB color space to an HSV color space (step S16), and the achromatic color part/chromatic color part separation unit 17 separates the image into achromatic and chromatic color parts based on color information (step S17). Details of this achromatic color part/chromatic color part separation processing will be described later.

The achromatic color part region dividing unit 18 divides an achromatic color part into clusters (step S18). Parallel to the process in step S18, the chromatic color part region dividing unit 19 divides a chromatic color part into clusters (step S19). These region dividing processes will be described later.

After the process in step S18, the achromatic color part region integrating unit 20 integrates the clusters of the achromatic color part divided in the previous step (step S20). Furthermore, after the process in step S19, the chromatic color part region integrating unit 21 integrates the clusters of the chromatic color part divided in the previous step (step S21). Note that details of these region integrating processes will be described later.

After the processes in steps S20 and S21, the noise region determination unit 22 executes labeling processing of the region dividing results (step S22). The results are checked based upon the sizes of the label regions if a region of interest is a noise region (step S23). As a result, if the label region is relatively small, that region is determined as a noise region. Note that details of this noise determination processing will be described later.

If the region of interest is determined as a noise region in step S23 (Yes), the noise region re-processing unit 23 executes clustering processing of noise pixels included in the determined noise region based on similarities with a neighboring region again (step S24), and the process advances to step S25. Details of this noise re-processing will be described later. On the other hand, if the region of interest is not determined as a noise region in step S23 (No), the process jumps to step S25. Step S25 checks whether or not all the label regions have been processed. As a result, if label regions to be processed still remain (No), the process returns to step S23 to repeat the aforementioned noise region determination processing and noise region re-processing. On the other hand, if no label region to be processed remains (Yes), the noise processing ends.

In step S26, the edge cluster determination unit 24 identifies as edge clusters, clusters that include edge information distinct from the edge clusters which were formed first from the divided regions. In step S27, the edge cluster integrating unit 25 integrates the cluster determined to be the edge cluster to that formed first. Note that details of the edge cluster determination processing and integrating processing will be described later.

In step S28, the vector conversion unit 26 converts each of divided regions into vector data based on outline data and colors in the region. As a technique for implementing this vector conversion processing, a technique for tracing outlines of a binary image and selecting coordinate vectors to convert the image into vector data (e.g., Japanese Patent No. 2,885,999 (U.S. Pat. No. 5,757,961)) is known. Note that the vector conversion processing of this embodiment uses this technique.

<Selection Example of Clipart Image>

Figure 3:
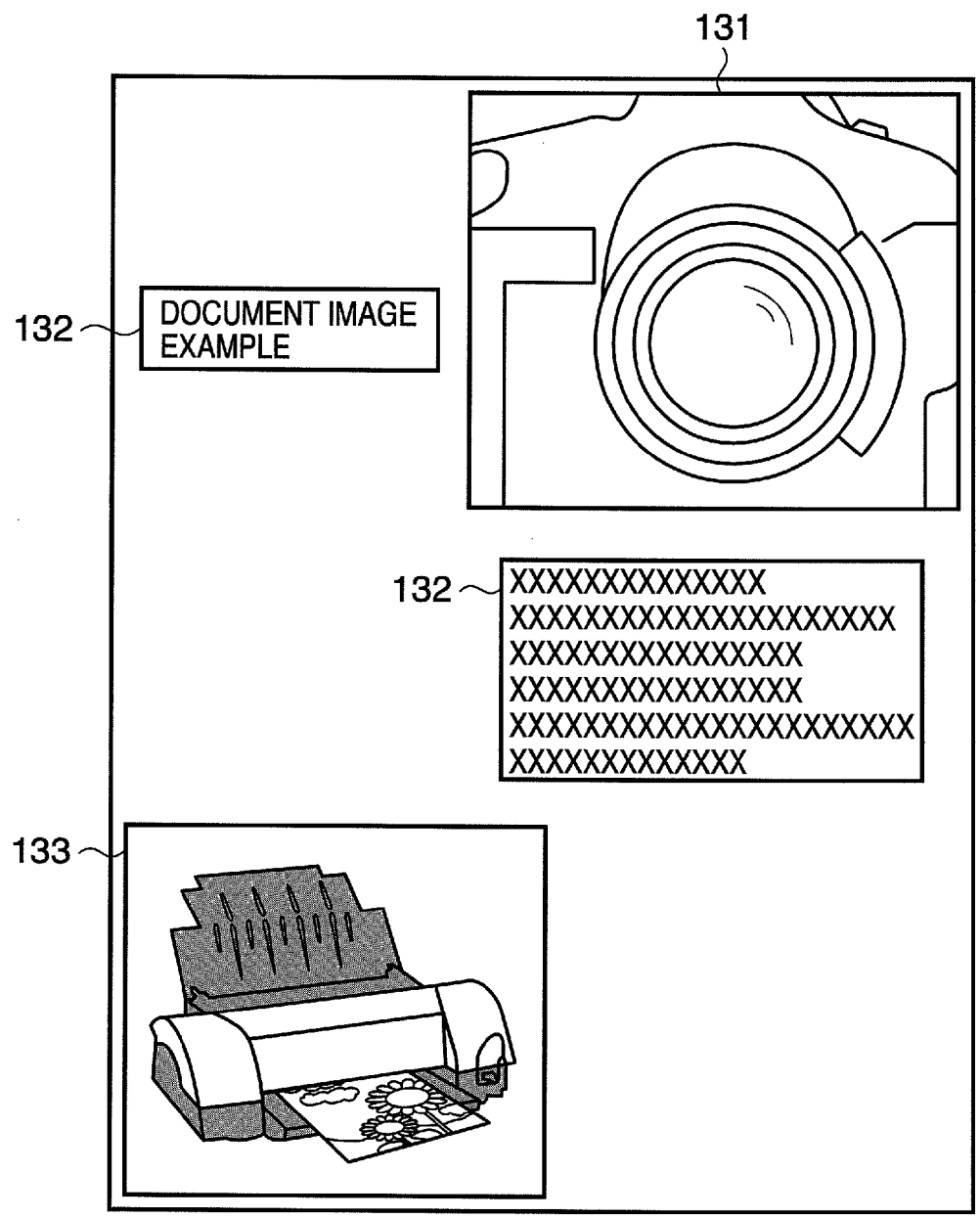
FIG. 3 shows an example of a clipart image selected from a document image in image processing according to the first embodiment of the present invention.

FIG. 3 shows an example of a clipart image selected from a document image in the image processing according to the first embodiment of the present invention. FIG. 3 shows a state in which a photographic image region 131, text regions 132, and a clipart region 133 are respectively divided as rectangular regions from one document image using the aforementioned region dividing method.

<Edge Cluster Forming Processing>

Figure 4:
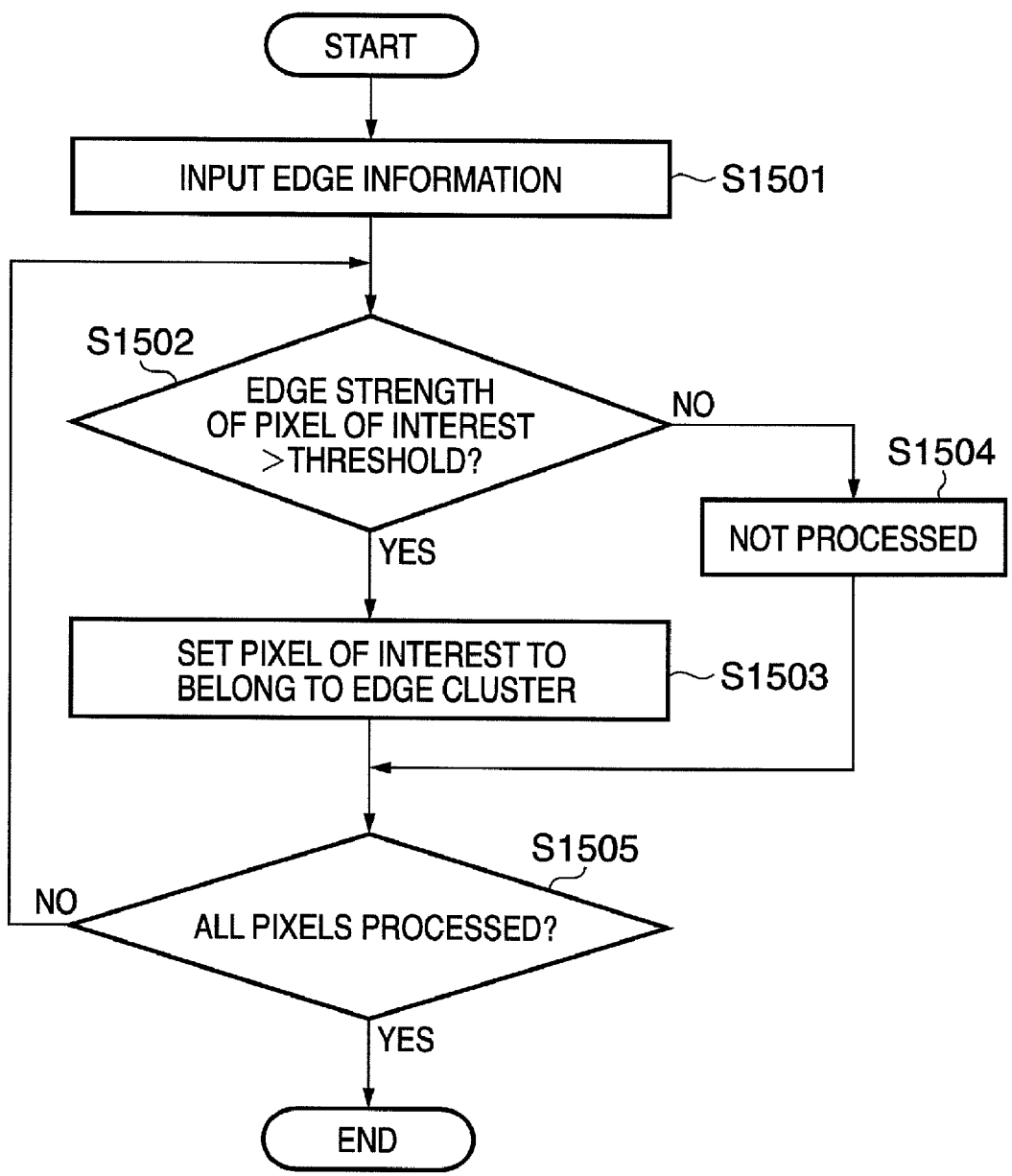
FIG. 4 is a flowchart for explaining details of edge cluster forming processing in step S15 in FIGS. 2A and 2B.

FIG. 4 is a flowchart for explaining details of the edge cluster forming processing of step S15 in FIGS. 2A and 2B.

Edge information extracted from a clipart image is input (step S1501), and the edge strength of a start pixel of a raster scan is compared with a threshold value which is set in advance (step S1502). As a result, if the edge strength of the pixel of interest is higher than the threshold, it is determined that the pixel of interest is surely located at an edge (Yes), and this pixel is set to belong to an edge cluster (step S1503). On the other hand, if the edge strength of the pixel of interest is lower than the threshold value (No), this pixel is not set to belong to an edge cluster (step S1504). It is checked in step S1505 if all pixels have been processed. As a result, if pixels to be processed still remain (No), the process returns to step S1501 to repeat the aforementioned processes. On the other hand, if no pixel to be processed remains (Yes), the edge cluster forming processing ends.

<Edge Cluster Formation Example>

Figure 5:
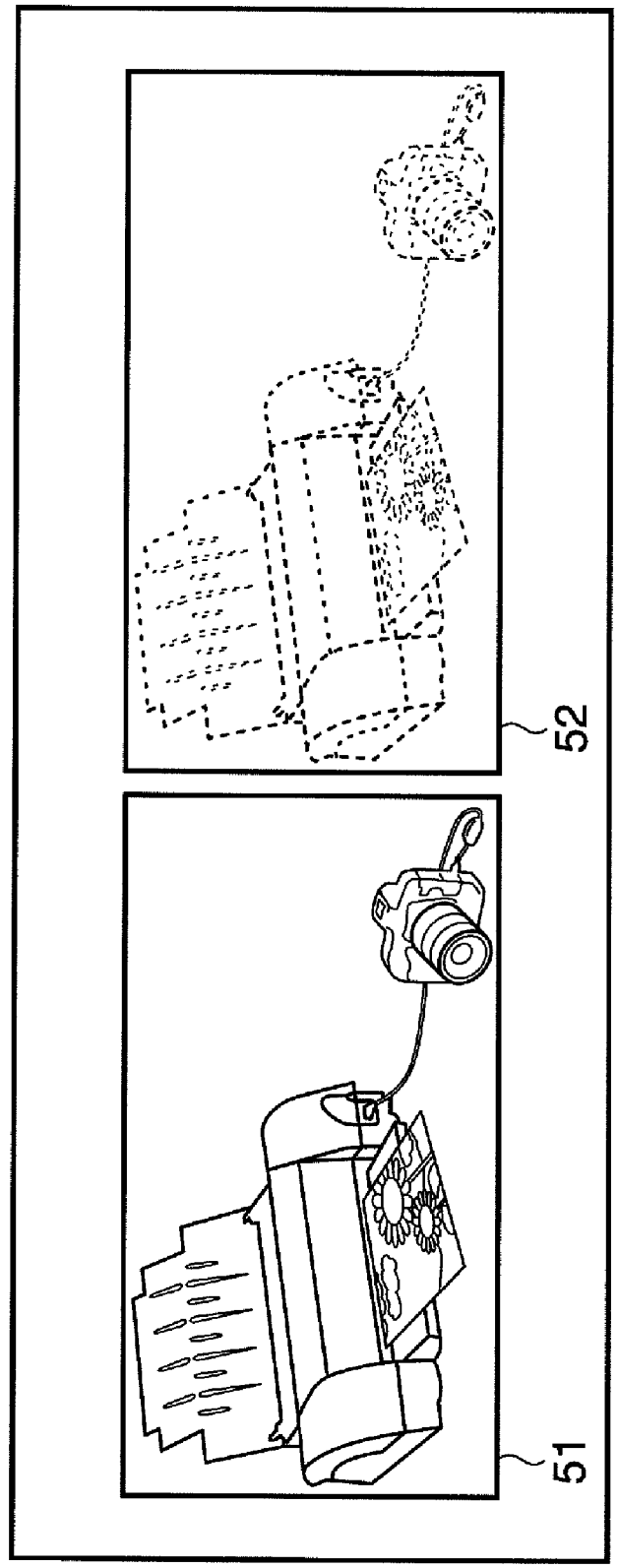
FIG. 5 shows an example of an edge cluster formed based on the clipart image according to the first embodiment of the present invention.

FIG. 5 shows an edge cluster formed from a clipart image according to the first embodiment of the present invention. Based on this clipart image, an edge image 51 is formed by edge extraction, and an edge cluster 52 is formed by the aforementioned edge cluster forming processing when the threshold value is set to be 120.

<Achromatic Color Part/Chromatic Color Part Separation Processing>

Figure 6:
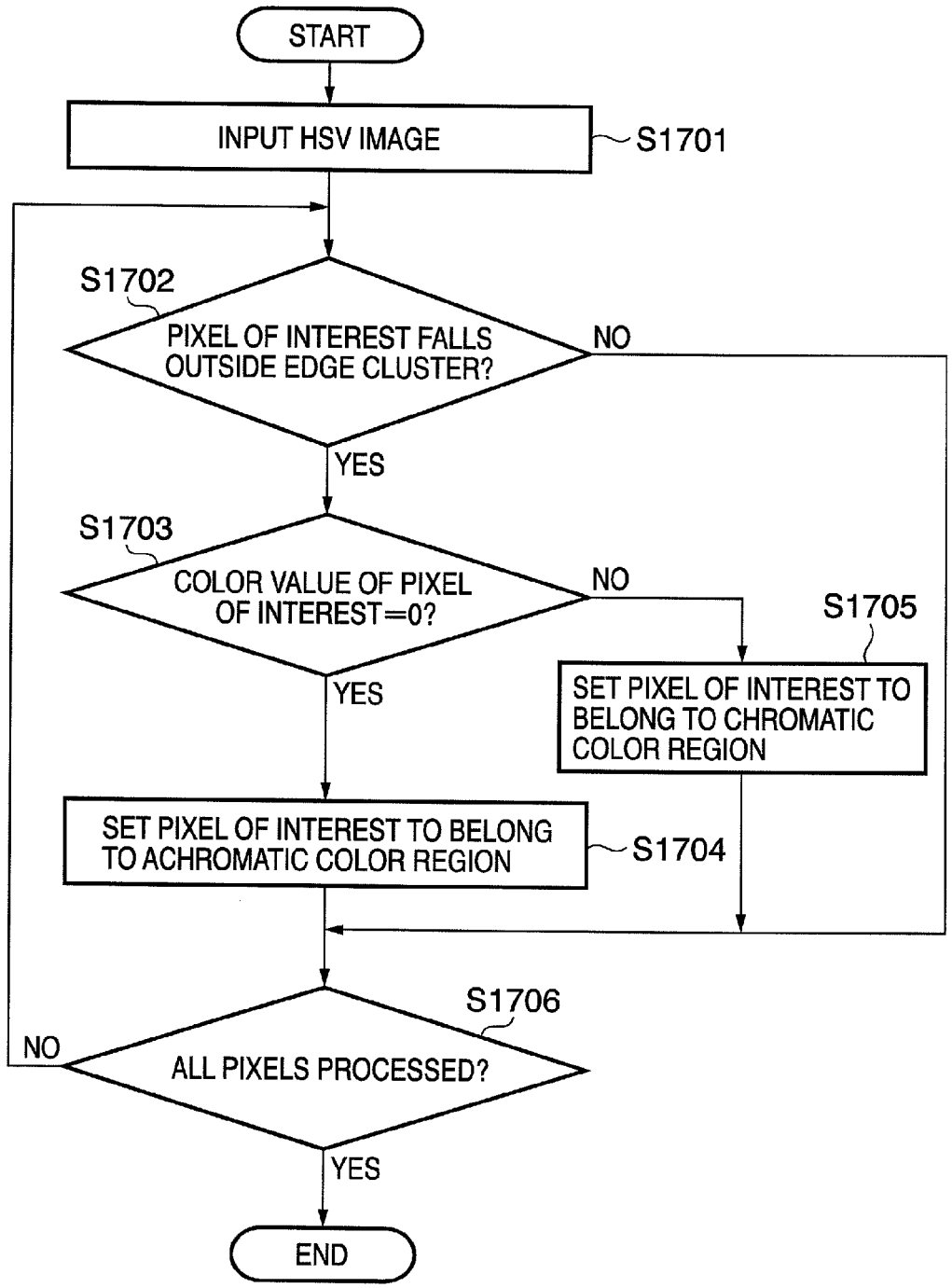
FIG. 6 is a flowchart for explaining details of separation processing of achromatic and chromatic color areas in step S17 in FIGS. 2A and 2B.

FIG. 6 is a flowchart for explaining details of the achromatic color part/chromatic color part separation processing in step S17 in FIGS. 2A and 2B.

An HSV image after color space conversion is input (step S1701). It is checked if the start pixel of a raster scan falls outside the edge cluster formed in step S15 (step S1702). As a result, if the pixel of interest does not belong to the edge cluster (Yes), the process advances to step S1703; otherwise, the process jumps to step S1706.

It is checked in step S1703 if the color value of the pixel of interest is zero. If the color value is zero (Yes), the process advances to step S1704 to set the pixel of interest to belong to an achromatic color region. On the other hand, if the color value is not zero (No), the process advances to step S1705 to set the pixel of interest to belong to a chromatic color region. It is checked in step S1706 if all pixels have been processed. As a result, if pixels to be processed still remain (No), the process returns to step S1702 to repeat the aforementioned achromatic color part/chromatic color part separation processing. On the other hand, if no pixel to be processed remains (Yes), the achromatic color part/chromatic color part separation processing ends.

<Achromatic Color Part Region Dividing Processing>

Figure 7:
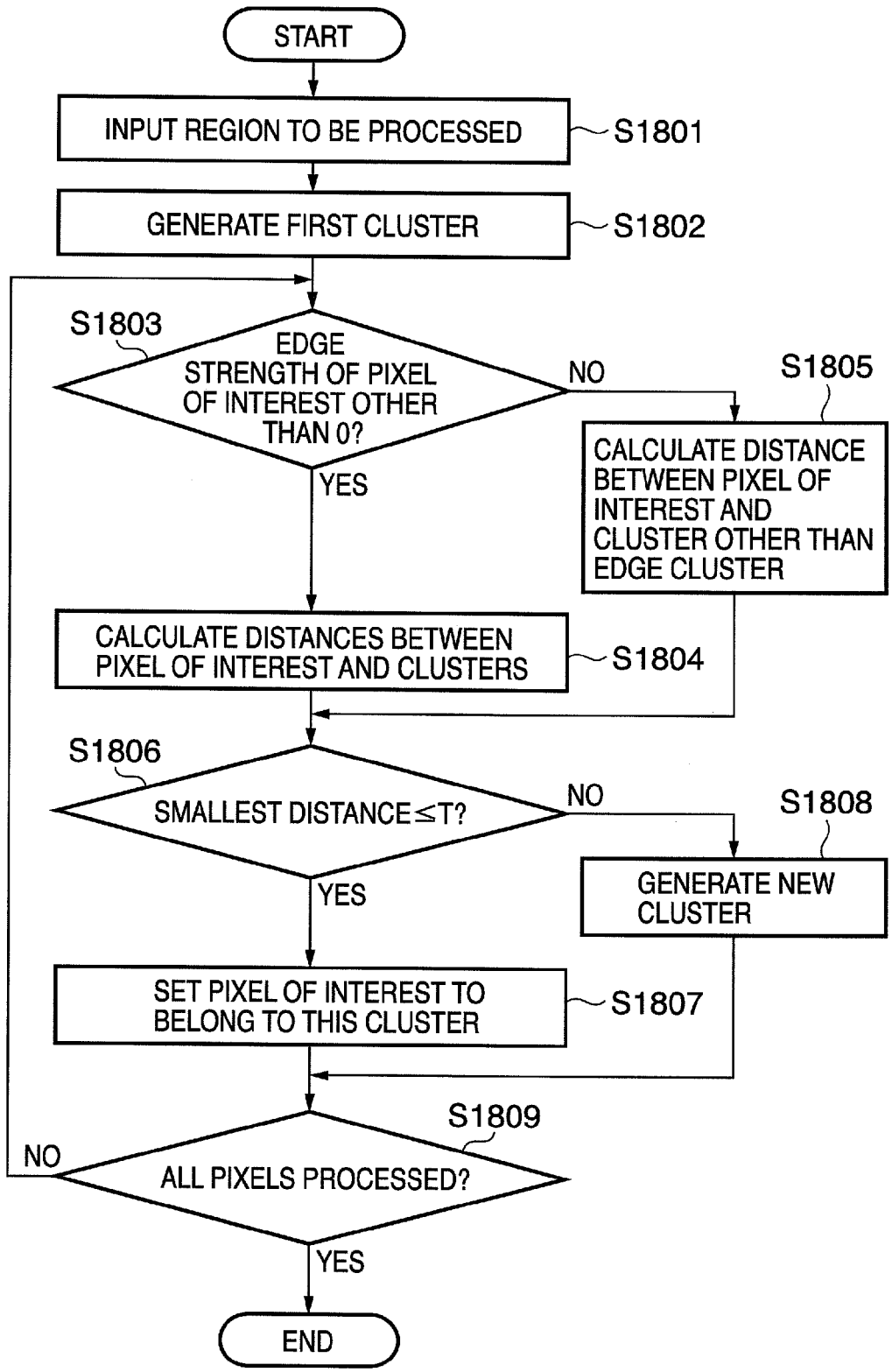
FIG. 7 is a flowchart for explaining details of region dividing processing of an achromatic color area in step S18 in FIGS. 2A and 2B.

FIG. 7 is a flowchart showing details of the achromatic color part region dividing processing in step S18 in FIGS. 2A and 2B.

The separated achromatic color part is input as an object to be processed (step S1801). A first cluster is generated by the start pixel of the raster-scanned object to be processed (step S1802). It is checked based on an edge strength value if the next pixel to be processed is likely to belong to an edge cluster (step S1803). As a result, if the edge strength of the pixel of interest is other than zero (Yes), since the pixel of interest can belong to the edge cluster, distances between the pixel of interest and clusters including the firstly formed edge cluster are calculated (step S1804). On the other hand, if the edge strength of the pixel of interest is zero (No), the distance between the pixel of interest and a cluster other than the edge cluster is calculated so as not to set that pixel to belong to the edge cluster (step S1805). Note that the achromatic color part region dividing processing uses a brightness value as a characteristic value of a pixel, and the difference between the brightness values is calculated as the distance between the pixel and cluster. If the distance is short, it is considered that the pixel to be processed has a feature approximate to the cluster, i.e., a similarity is high.

In step S1806, the smallest distance and a cluster number corresponding to that distance are recorded, and the distance is compared with a threshold T which is set in advance. If the distance is equal to or smaller than the threshold T (Yes), the pixel of interest is set to be belonging to the recorded cluster (step S1807). On the other hand, if the distance is larger than the threshold T (No), a new cluster is generated based on the pixel of interest (step S1808). It is checked in step S1809 if all pixels have been processed. If pixels to be processed still remain (No), the process returns to step S1803 to repeat the aforementioned processes. On the other hand, if no pixel to be processed remains (Yes), the region dividing processing ends.

<Chromatic Color Part Region Dividing Processing>

The chromatic color part region dividing processing in step S19 is the achromatic color part region dividing processing in step S18, except that RGB color information is used as a characteristic value of a pixel, and the Euclidean distance between RGB color features is calculated as the distance between the pixel and cluster.

<Achromatic Color Part Region Integrating Processing>

Figure 8:
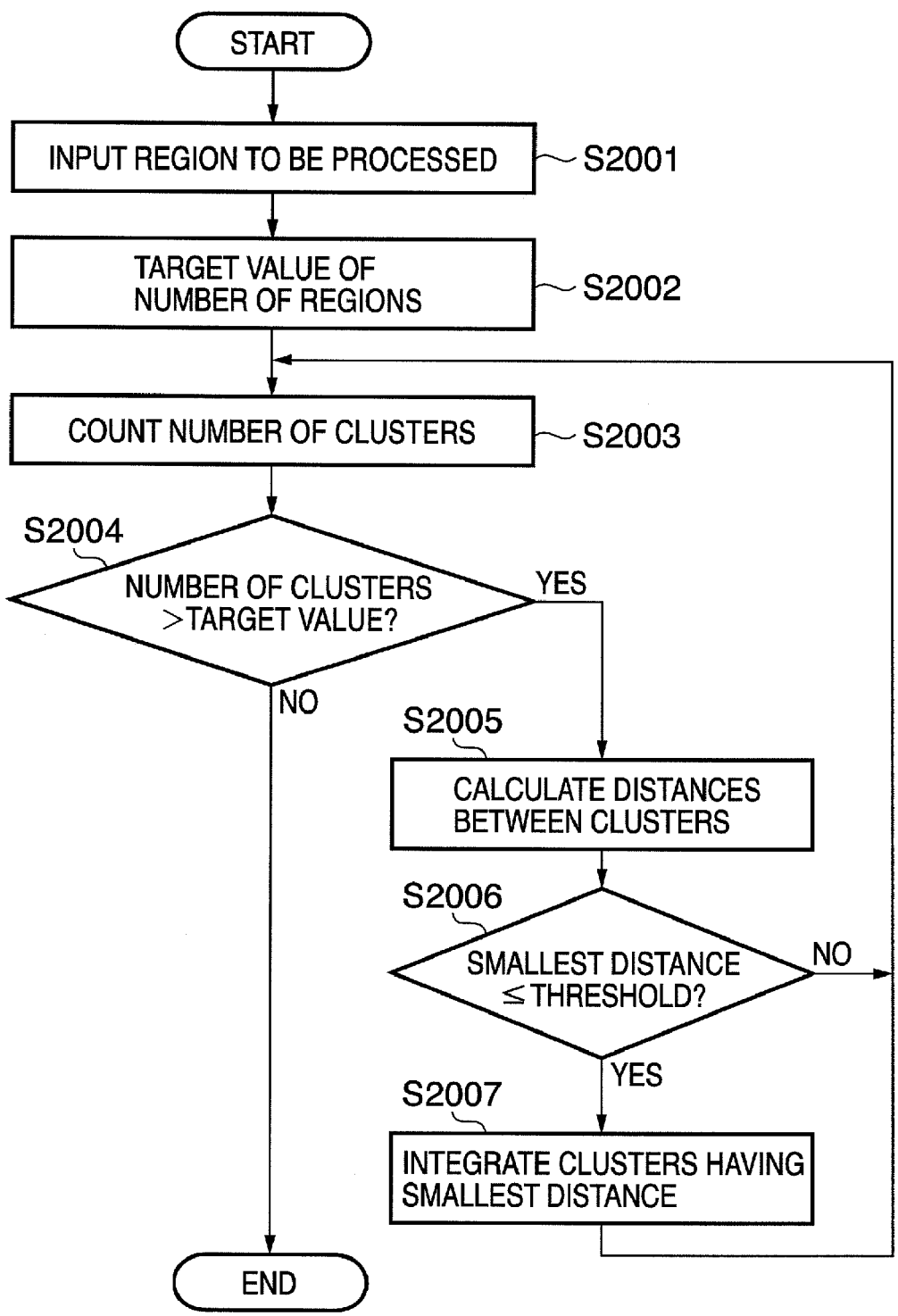
FIG. 8 is a flowchart for explaining details of region integrating processing of an achromatic color area in step S20 in FIGS. 2A and 2B.

FIG. 8 is a flowchart for explaining details of the achromatic color region integrating processing in step S20 in FIGS. 2A and 2B.

The divided clusters of the achromatic color areas are input as objects to be processed (step S2001). A target value of the number of regions into which the object to be processed is separated is input (step S2002). This value is used as an indication for an approximate number of colors to be separated. In step S2003, the number of current clusters is counted. In step S2004, the number of current clusters is compared with the target value. As a result, if the number of current clusters is smaller than the target value (No), the region integrating processing ends. On the other hand, if the number of clusters is larger than the target value (Yes), it is determined in the processes in steps S2005 and S2006 if the clusters are to be integrated. In the integrating processing, in order to prevent an edge part and a non-edge part of an image from being erroneously integrated, an edge cluster is excluded from an object which is to undergo the integrating processing. Hence, the distances between clusters are calculated, and the two clusters having the smallest distance are selected in step S2005. In step S2006, the distance between these two clusters is compared with a threshold which is set in advance. If the distance is equal to or smaller than the threshold (Yes), it is determined that an integrating condition is met, and the process advances to step S2007 to integrate these two clusters. On the other hand, if the distance is larger than the threshold (No), the process returns to step S2003. After completion of one integrating process, the process returns to step S2003 to repeat the region integrating processing. Note that the achromatic color region integrating processing uses brightness values as characteristic values of clusters, and the difference between the brightness values is calculated as the distance between clusters. The integrating condition is set so that the difference between the brightness values of clusters is equal to or smaller than a threshold of a brightness value which is set in advance.

<Chromatic Color Part Region Integrating Processing>

The chromatic color part region integrating processing in step S21 is the same as the achromatic color region integrating processing in step S20. However, as characteristic values of clusters, RGB color information and hue (H) information are used, and as the distance between clusters; two distances, that is, the Euclidean distance between RGB color features and the distance between two pieces of hue (H) information are calculated. The integrating condition is set so that the distance between two pieces of RGB color information of clusters is equal to or smaller than an RGB color threshold, and the distance between two pieces of hue (H) information of clusters is equal to or smaller than an H threshold.

The reason why the hue (H) information is used is that a gradation of one color has a feature that color values vary over a broad range but hue values do not.

<Noise Region Determination Processing>

Figure 9:
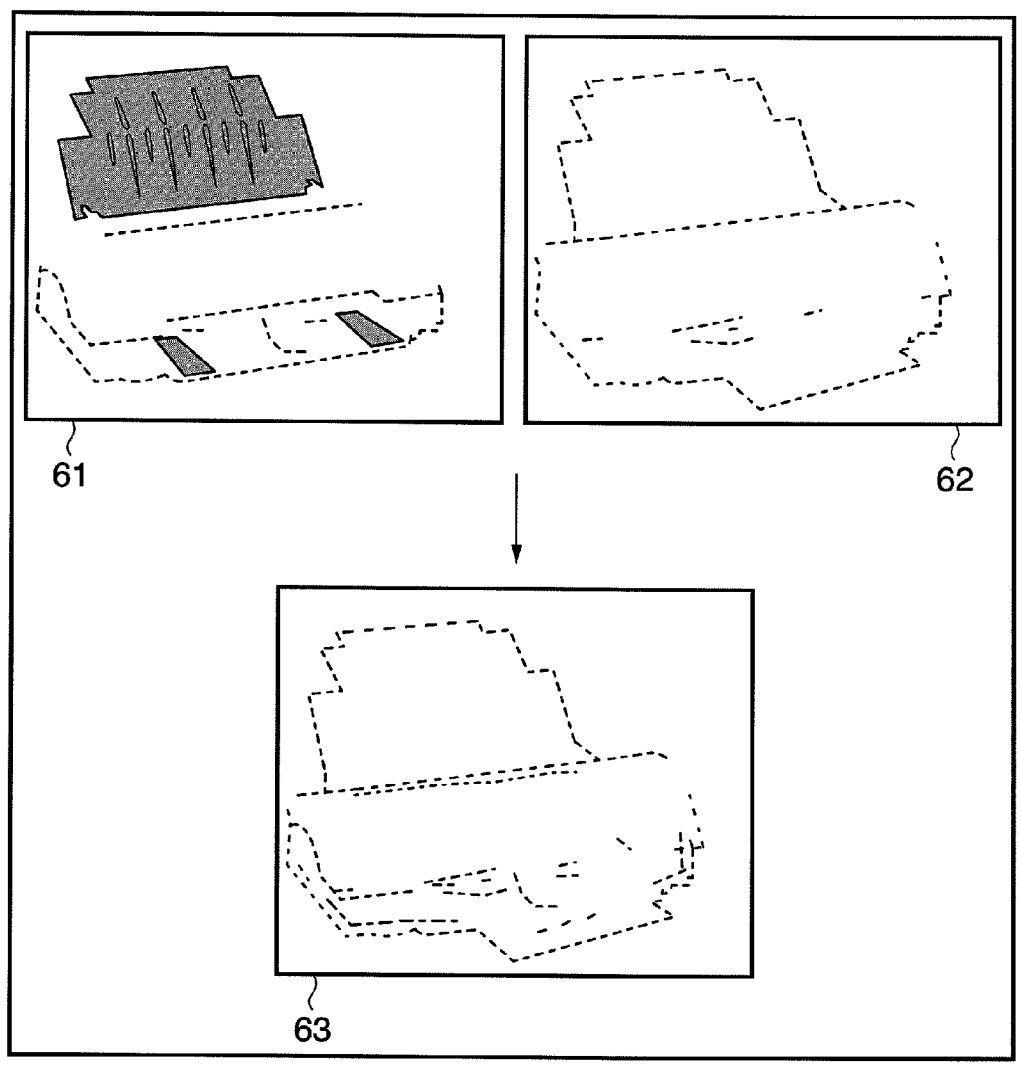
FIG. 9 shows an example of noise to be handled in the image processing according to the first embodiment of the present invention.

FIG. 9 shows an example of noise to be handled in the image processing according to the first embodiment of the present invention. Referring to FIG. 9, clusters 61 and 62 are examples of two clusters which are selected as representatives from those after the region dividing processing and region integrating processing. A large number of small regions exist in these clusters, and if the outline data and internal color information of these clusters are converted into vector data, the data size becomes huge, thus posing a problem. To solve this problem, as described above, the region dividing results undergo labeling processing in step S18. It is then checked based on the size of each label region in step S19 if a label region of interest is a noise region. As a result, if the label region of interest is smaller than a given threshold, that region is determined to be a noise region, and the process returns to the noise region re-processing. Note that respective regions included in noise 63 are those which are determined to be noise regions.

<Re-Processing of Noise Region>

Figure 10:
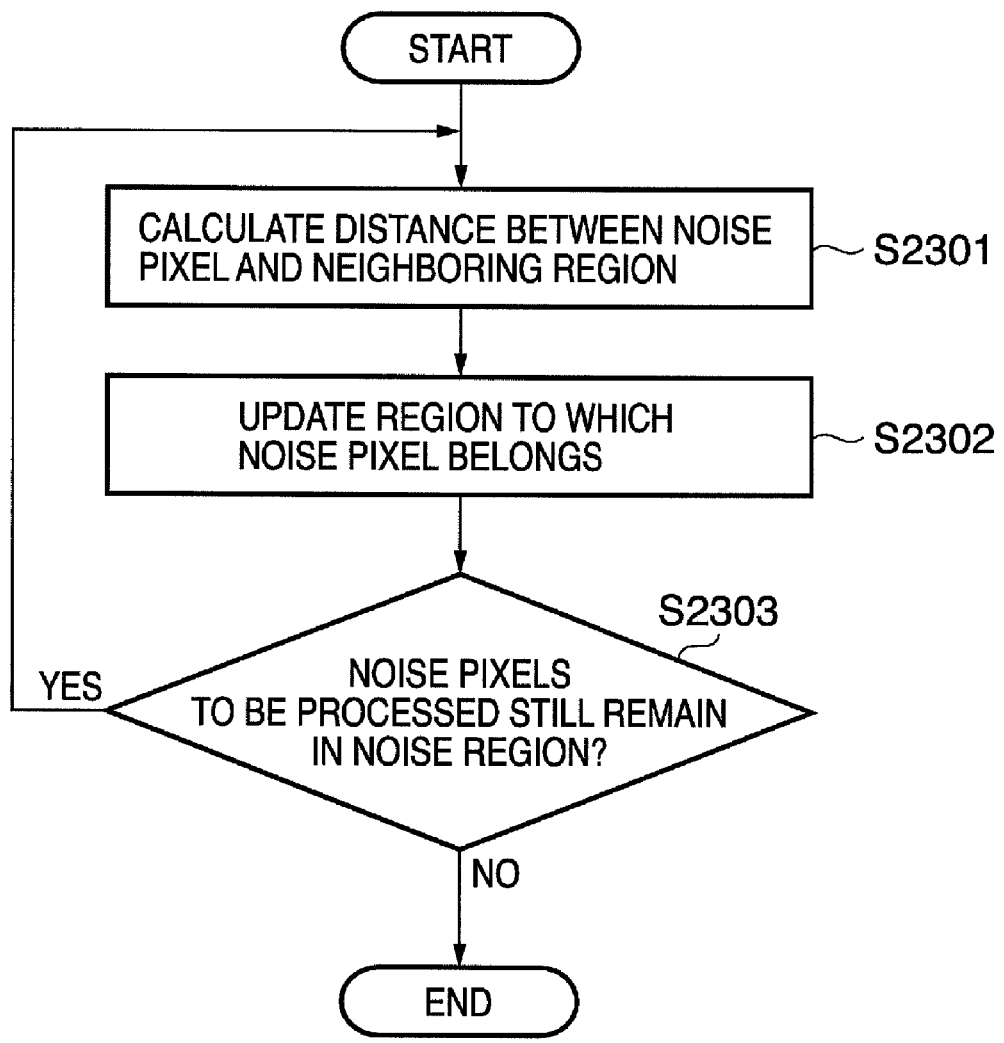
FIG. 10 is a flowchart for explaining details of re-processing of a noise region in step S23 in FIGS. 2A and 2B.

FIG. 10 is a flowchart for explaining details of the noise region re-processing in step S23 in FIGS. 2A and 2B. In this case, the noise region determined in step S22 is selected as an object which is to undergo noise region re-processing, and removal processing is executed for each noise pixel included in the noise region.

Similarities between a noise pixel and neighboring clusters are calculated (step S2301). The noise pixel is set to belong to a cluster with the highest of the calculated similarities (step S2302). It is checked if the removal processing of all the pixels of the noise region has been completed (step S2303). If pixels to be processed still remain (Yes), the process returns to step S2301 to repeat the above processes. On the other hand, if no pixel to be processed remains (No), the noise region re-processing ends.

<Edge Cluster Determination Processing and Integrating Processing>

FIG. 11 is a flowchart for explaining details of the edge cluster determination processing in step S24 and details of the edge cluster integrating processing in step S25 in FIGS. 2A and 2B.

In step S2401, an edge ratio of a cluster other than the edge cluster which is formed first is calculated. The edge ratio is the ratio of the number of pixels located in an edge to that of a cluster, and a higher ratio corresponds to a larger number of pixels located in an edge. It is checked based on the edge ratio in step S2402 if a cluster to be processed is an edge cluster. As a result, if the edge ratio is somewhat high (Yes), that cluster is determined to be an edge cluster, and the process advances to step S2403. In step S2403, the information of this cluster is added to the first edge cluster to be integrated into one cluster, and the process advances to step S2404. On the other hand, if the edge ratio is not high (No), the cluster of interest is determined not to be an edge cluster, and the process advances to step S2404. It is checked in step S2404 if clusters to be processed still remain. If clusters to be processed still remain (Yes), the process returns to step S2401 to repeat the aforementioned processes. On the other hand, if no cluster to be processed remains (No), the edge cluster determination processing and integrating processing end.

<Example of Edge Cluster Integration>

FIG. 12 shows an example in which a cluster is determined to be an edge cluster from divided clusters and is integrated to the edge cluster according to the first embodiment of the present invention. In FIG. 12, reference numerals 71 and 72 denote clusters which are determined to be edge clusters based on their edge ratios. Reference numeral 73 denotes an edge cluster to which the edge clusters 71 and 72 are integrated.

<Example of Vector Conversion Based on Region Dividing of Clipart Image>

Figure 13B:
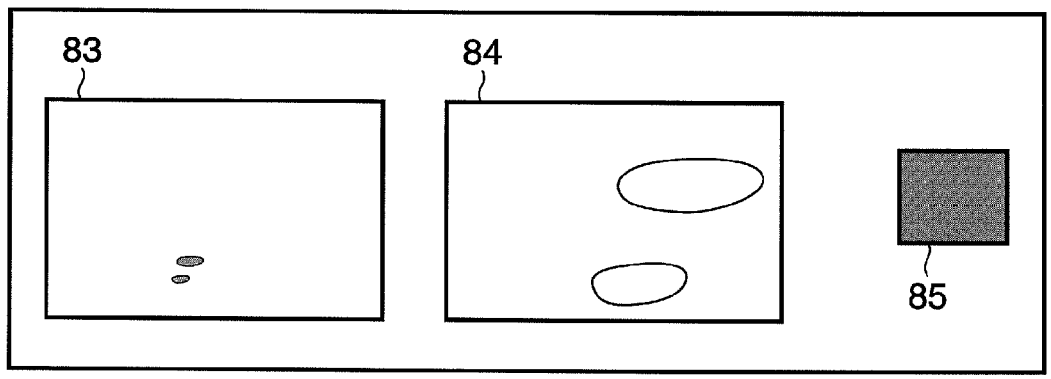
Figure 13C:
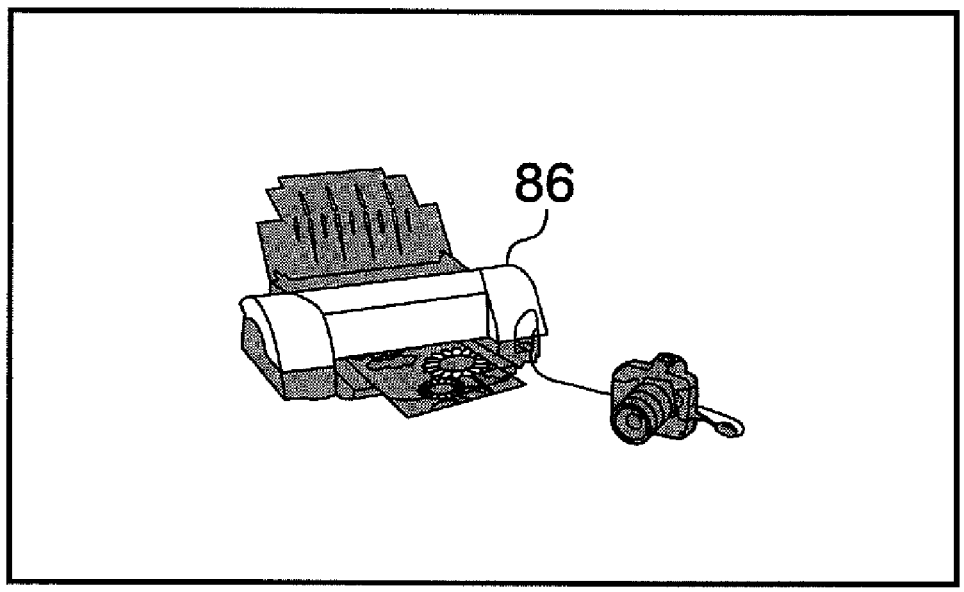

FIGS. 13A to 13C show an example of vector conversion based on region dividing of a clipart image according to the first embodiment of the present invention.

An example of the region dividing processing result will be described first. In FIG. 13A, a clipart image 81 is divided into clusters of a region dividing result 82 by a series of processes described above when the target value of the number of regions to be divided is designated to be 10. The series of processes include the edge cluster formation, color space conversion, achromatic color part/chromatic color part separation, achromatic color part/chromatic color part region dividing, achromatic color part/chromatic color part region integration, noise region determination, noise region re-processing, edge cluster determination, and edge cluster integrating processing.

An example of the vector conversion processing result will be described below. FIG. 13B shows an example of outline data and internal color information of a cluster required for the vector conversion processing, and illustrates a cluster 83, outline data 84, and internal color information 85. FIG. 13C shows a vector image 86 as a result of conversion of the region dividing result 82 into vector data.

As described above, according to this embodiment, an image is separated into an achromatic color part and chromatic color part based on color information, and these achromatic and chromatic color parts independently undergo region dividing and region integration, thus accurately attaining region dividing of a gradation part. As a result, the data sizes required for vector conversion description of respective region outline data are reduced, and satisfactory image parts can be obtained.

Second Embodiment

<Apparatus Arrangement>

FIG. 14 is a block diagram showing the arrangement of an image processing apparatus which executes vector conversion processing of an image with gradation according to the second embodiment of the present invention. Referring to FIG. 14, reference numeral 111 denotes an image input unit which inputs an image to be processed; 112, a region dividing unit which divides the image into regions based on color information; 113, a labeling processing unit which separates each region into label regions; and 114, a color change direction detection unit which detects color change directions of pixels for each label region. Reference numeral 115 denotes a gradation type determination unit which determines linear or radial gradation based on the color change directions of the label regions, and reference numeral 116 denotes a vector description unit which performs conversion to vector data in correspondence with the gradation type.

<Overview of Vector Conversion Processing Based on Region Dividing>

Figure 15:
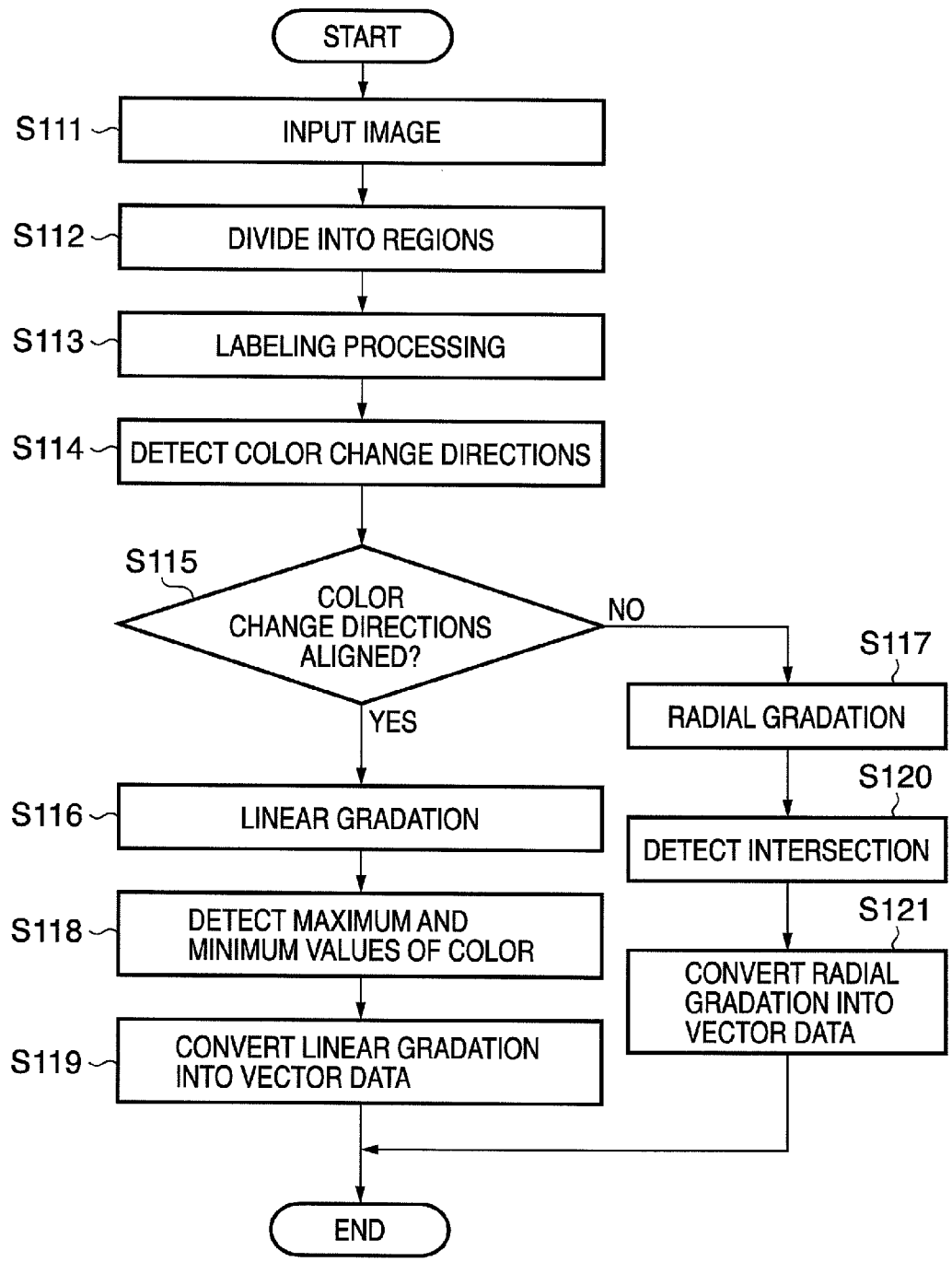
FIG. 15 is a flowchart for explaining vector conversion processing based on region dividing according to the second embodiment.

FIG. 15 is a flowchart for explaining the vector conversion processing sequence based on region dividing according to the second embodiment.

The image input unit 111 inputs an image to be processed (step S111). The region dividing unit 112 executes region dividing processing for appropriately dividing the image into regions based on color features (step S112). This region dividing processing will be described later using the flowchart of FIG. 16 and a region dividing example of FIG. 17.

In step S113, the labeling processing unit 113 executes labeling processing for further separating each region obtained by the region dividing processing into smaller label regions and allowing for determination of the gradation types for respective label regions. Note that a known labeling processing process is used.

In step S114, the color change direction detection unit 114 detects color change directions using color information of pixels in each label region. The color change direction detection processing will be described later using color change direction detection examples shown in FIGS. 18 and 19.

In steps S115 to S117, the gradation type determination unit 115 determines the type of gradation by checking if the color change directions of pixels in each label region are aligned. As a result, if the color change directions of pixels are in the same direction in step S115 (Yes), it is determined that the gradation of the label region of interest is a linear gradation (step S116). On the other hand, if the color change directions of pixels are not in the same direction (No), it is determined that the gradation of the label region of interest is a radial gradation (step S117).

In steps S118 to S121, the vector conversion description unit 116 describes the gradation using a vector in accordance with the gradation type of each label region. In the case of the linear gradation, the maximum value and minimum value of a color located in the linear gradation region are detected (step S118), and are described by a vector of the linear gradation (step S119). On the other hand, in the case of the radial gradation, an intersection of the radial gradation is detected (step S120) and is described by a vector of the radial gradation (step S121). Note that the intersection detection processing of the radial gradation will be described later with reference to FIG. 20, and the vector description of the gradation will be described later with reference to FIG. 19.

<Region Dividing Processing>

FIG. 16 is a flowchart for explaining details of the region dividing processing of an image with gradation according to the second embodiment of the present invention.

An image with gradation is converted from an RGB color space into an HSV color space (step S1201). The image is separated into an achromatic color area and a chromatic color are based on saturation information S of the HSV color space (step S1202). With this processing, a pixel whose saturation S is zero is set to belong to an achromatic color area, and a pixel whose saturation S is not zero is set to belong to a chromatic color area.

In steps S1203 and S1204, the achromatic color area and chromatic color area are respectively divided into regions. In steps S1205 and S1206, the regions of the achromatic color area and chromatic color area are respectively integrated. These processes will be described in turn below.

The achromatic color region dividing processing in step S1203 is processing for dividing pixels which belong to the achromatic color area into regions. A first achromatic color cluster is generated by the start pixel of a raster scan. Similarities between the next pixel and all achromatic clusters are calculated. The pixel and cluster have closer features with increasing similarity. In this case, RGB values are used to calculate similarities. Alternatively, information of other color spaces or information other than colors may be used as characteristic values. The highest similarity and a cluster number corresponding to this similarity are recorded, and this similarity is compared with a threshold which is set in advance. If the similarity is higher than the threshold, the pixel of interest is set to belong to the achromatic color cluster. On the other hand, if the similarity is lower than the threshold, a new achromatic color cluster is generated by the pixel of interest. This processing is repeated until all pixels located in the achromatic color area are processed.

Likewise, the chromatic color region dividing processing in step S1204 executes region dividing of the chromatic color area for pixels which belong to the chromatic color part.

The achromatic color region integrating processing in step S1205 is processing for integrating the clusters of the achromatic color area based on the region dividing results of the aforementioned achromatic color part. A target value of the number of achromatic color regions to be divided is input first. In this embodiment, this value is used as an indication for an approximate number of colors to be separated. The number of clusters of the achromatic color part is counted, and is compared with the target value of the number of regions. If the number of current clusters is larger than the target value, clusters are integrated. In the integrating processing, similarities between clusters are calculated, and two clusters with the highest similarity are integrated into one cluster. The region integrating processing is repeated until the number of current clusters becomes equal to or smaller than the target value.

Likewise, the chromatic color region integrating processing in step S1206 integrates clusters of the chromatic color area based on the aforementioned region dividing results of the chromatic color area.

In step S1207, the region integration results undergo labeling processing. Since many noise components are present near boundaries due to the influence of compression, the labeling processing further separates respective clusters of region integration into smaller label regions based on coupling information so as to determine noise regions.

It is checked in step S1208 based on the area of each label area obtained by the aforementioned labeling processing if a label region of interest is a noise region. Note that the area of the region is defined by the number of pixels located in that region. If the label region with a small area is determined to be a noise region in step S1208 (Yes), the process advances to step S1209. In step S1209, similarities between each noise pixel of interest which belongs to the noise region and surrounding regions are calculated, and the pixel of interest is assigned to the region with the highest similarity. This noise region re-processing is repeated until pixels located in the noise region are processed.

Figure 17:
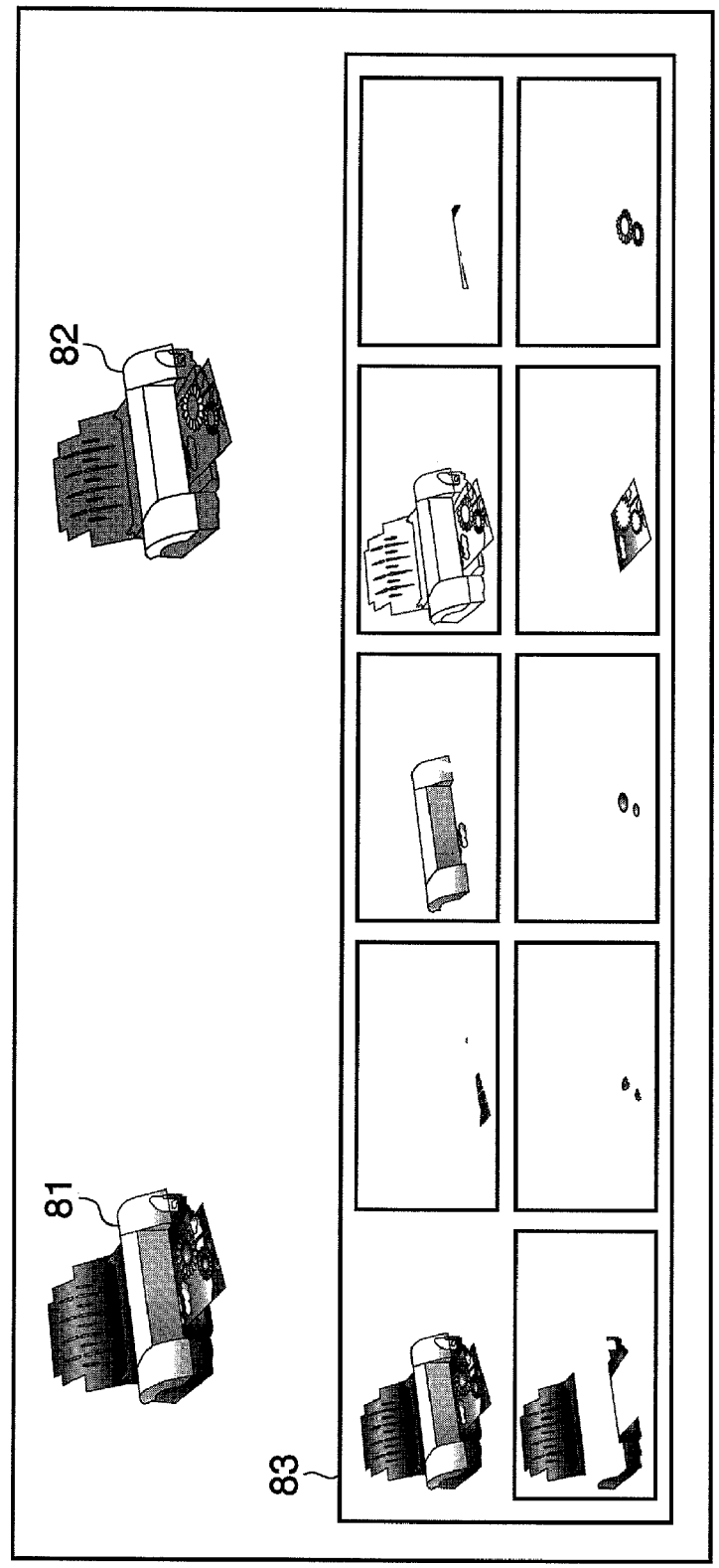
FIG. 17 shows an image example in the region dividing processing according to the second embodiment.

The aforementioned region dividing processing can obtain a result that can appropriately divide gradation of one color into one region without over-dividing the gradation part of an image with gradation. FIG. 17 shows an image example in the region dividing processing in the second embodiment. Referring to FIG. 17, reference numeral 81 denotes an original image with gradation. Reference numeral 82 denotes a region dividing result obtained by the region dividing processing, and each cluster is painted in an average of the colors of the pixels which belong to that cluster. Reference numeral 83 denotes results of regions (or clusters) of region dividing.

<Color Change Direction Detection Processing>

FIG. 18 shows eight types of masks corresponding to color change directions, that is, edge directions in the second embodiment. The color change direction detection processing will be described below using FIG. 18.

Each pixel located in the label region to be processed and surrounding pixels are multiplied by mask values in each of the eight masks, and the sum of the products is calculated. The direction of the mask which exhibits a maximum value defines the color change direction, e.g., the edge direction, and its calculated value defines the strength of the edge.

Figure 19:
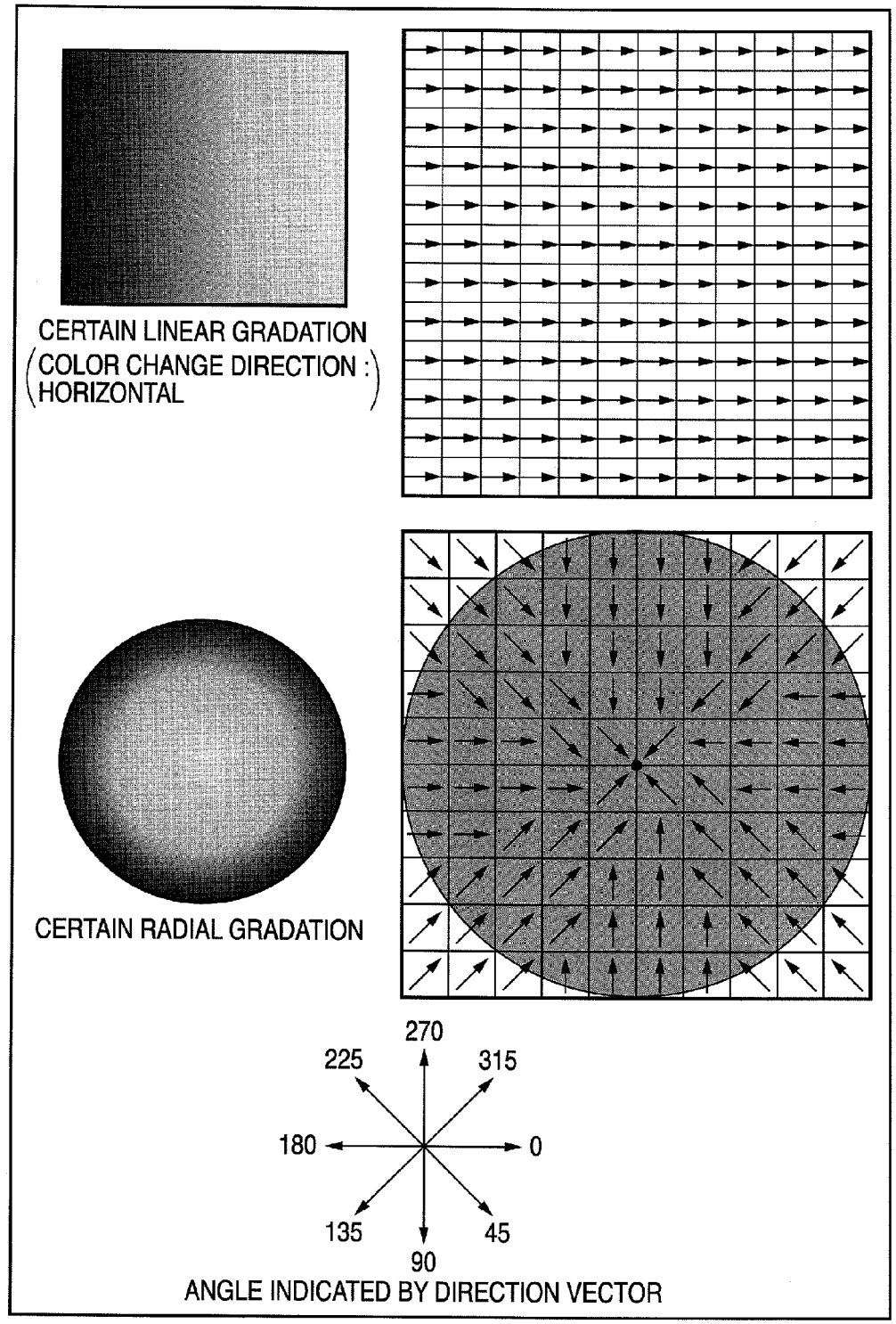
FIG. 19 shows color change directions of respective pixels calculated by color change direction detection processing in the second embodiment for a certain linear gradation region (horizontal direction) and certain radial gradation region.

FIG. 19 shows the color change directions of pixels calculated in the color change direction detection processing in the second embodiment for a certain linear gradation region (horizontal direction) and certain radial gradation region. In this linear gradation region in the horizontal direction, the color change directions of respective pixels are in the horizontal direction and are all aligned. In this radial gradation region, the color change directions of pixels are in radial directions from a given point.

This embodiment has explained the method of determining, as the color change direction, the edge direction with the highest edge strength of eight different edge strengths of each pixel using only eight different edges. In practice, the edge direction can be more finely adjusted in addition to the eight different edge directions. For example, by checking directions indicated by the right and left neighboring masks of the edge direction with the highest edge strength of the eight different edge strengths, the color change direction of the pixel can be more accurately obtained.

<Intersection Detection Processing>

Figure 20:
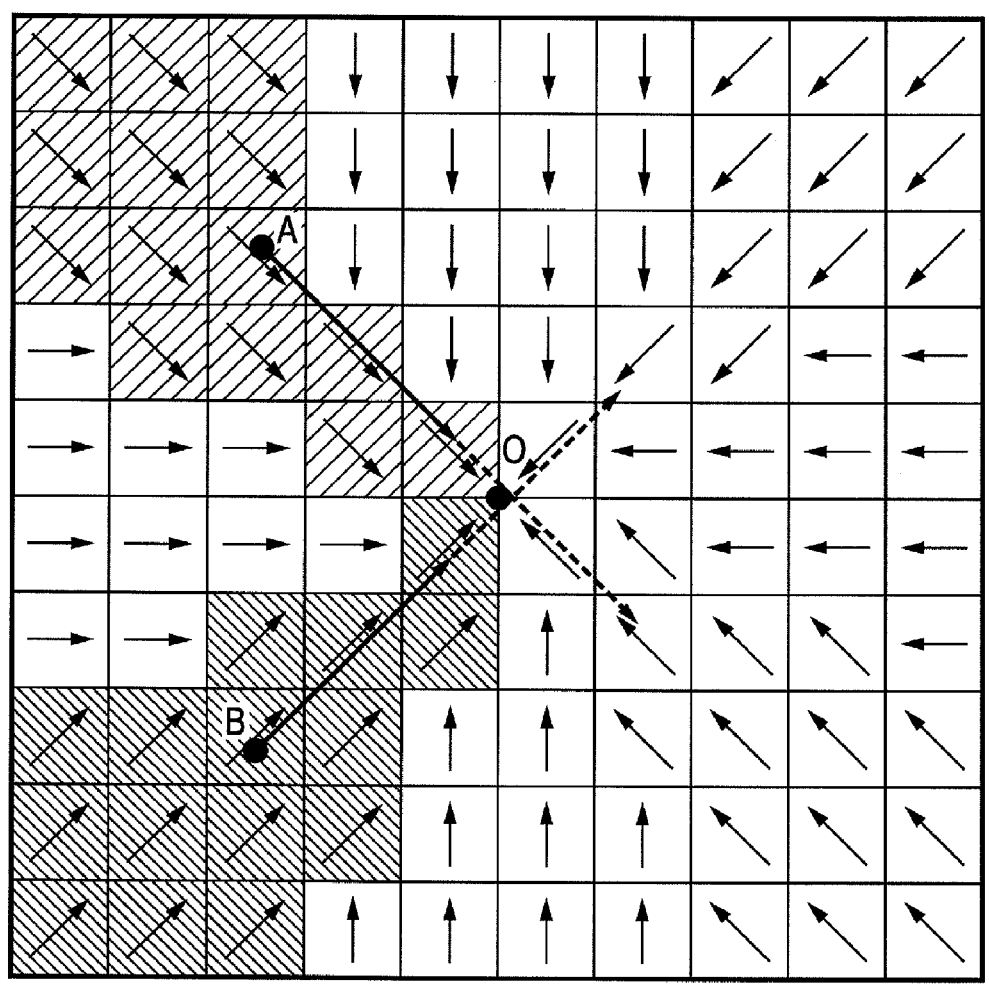
FIG. 20 is a view for explaining details of intersection detection processing according to the second embodiment.

FIG. 20 is a view for explaining details of the intersection detection processing according to the second embodiment. The intersection detection processing calculates the barycenter of a region of pixels having the same direction. For example, there are many pixels having edges in the lower right direction on the upper left part of FIG. 20, and these pixels form the first region. Based on the coordinates of these pixels, barycenter A of the first region is calculated. Likewise, pixels having edges in the upper right direction form the second region on the lower left part of FIG. 20. Based on these pixels, barycenter B of the second region can be calculated. With this processing, the barycenters of regions of pixels having the same directions can also be calculated.

A direction vector from each barycenter is defined as a representative vector of the region. For example, a lower right direction vector from A becomes a representative vector of the first region, and an upper right direction vector from B becomes that of the second region. With this processing, direction vectors from the barycenters of the region of pixels having the same directions can also be obtained.

Next, the intersection between two arbitrary direction vectors is obtained to determine the intersection of the gradation region. For example, the intersection between the lower right direction vector from A and the upper right direction vector from B is O.

When only the two direction vectors are used, the intersection between these two direction vectors may be determined as that of the gradation region. When a plurality of pairs of direction vectors are used, the average value of the intersections between the direction vector pairs may be calculated, and may be determined as the intersection of the gradation region.

<Vector Description>

FIG. 21 is a view for explaining the vector description processing in the second embodiment.

A vector description of the linear gradation will be explained first. In FIG. 21, a field between <defs> and </defs> describes the definition of a linear gradation pattern. In this field, <linearGradient> is a label of linear gradation, id=" . . . " is a pattern number, A is the maximum value of a color, and B is the minimum value of the color. A <path fill=" . . . "> is a rendering instruction of the defined linear gradation pattern.

A vector description of the radial gradation will be described below. In FIG. 21, a field between <defs> and </defs> describes the definition of a radial gradation pattern. In this field, <radialGradient> is a label of radial gradation, id=" . . . " is a pattern number, A is the color at the central point, and B is the color of a radial surrounding part. A <path fill=" . . . "> is a rendering instruction of the defined radial gradation pattern.

Figure 22A:
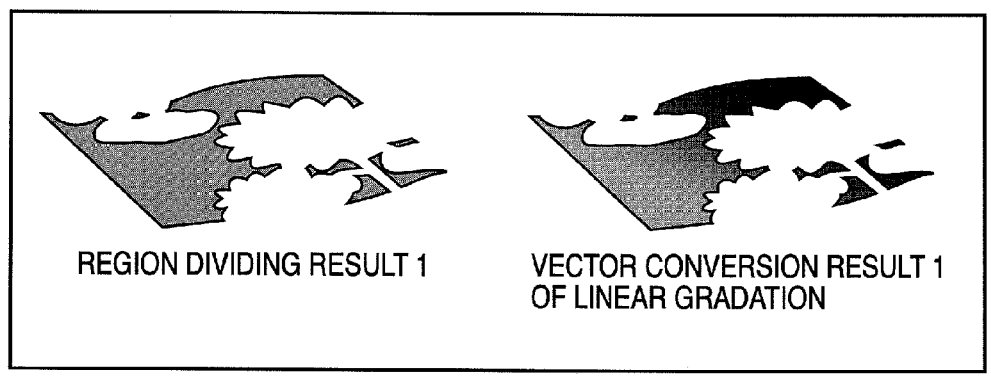
FIGS. 22A and 22B show a description result of certain region 1 as a linear gradation region, and that of certain region 2 as a radial gradation region after an image with gradation is divided into regions.
Figure 22B:
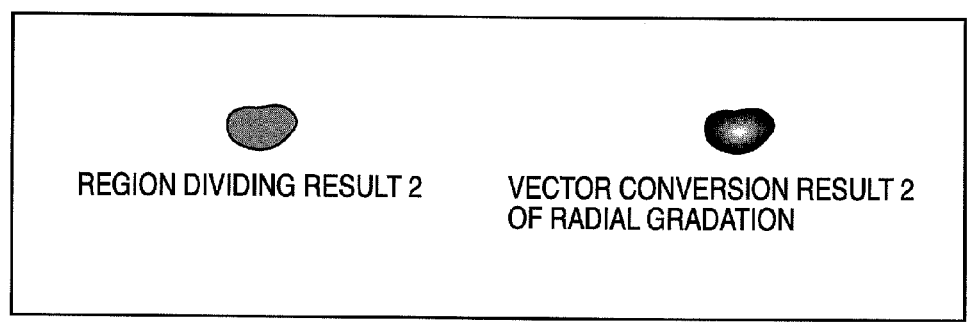

FIGS. 22A and 22B show a description result of a certain region 1 as a linear gradation region (FIG. 22A), and that of a certain region 2 as a radial gradation region (FIG. 22B) after an image with gradation is divided into regions.

As described above, according to the second embodiment, after an image with gradation is divided into regions, the divided regions are separated into label regions, and the color change directions of the label regions are detected. Then, it is checked if the color change directions are aligned to determine whether the gradation is linear or radial. A vector description is made in correspondence with the determined gradation. In this way, a gradation region approximate to an original image can be reproduced. Also, a high compression ratio of data can be obtained due to vector conversion.

Third Embodiment

The third embodiment of the present invention will be described below. This embodiment will explain a method of determining whether the type of gradation is linear or radial by checking for the presence/absence of an intersection in place of color change directions.

Figure 23:
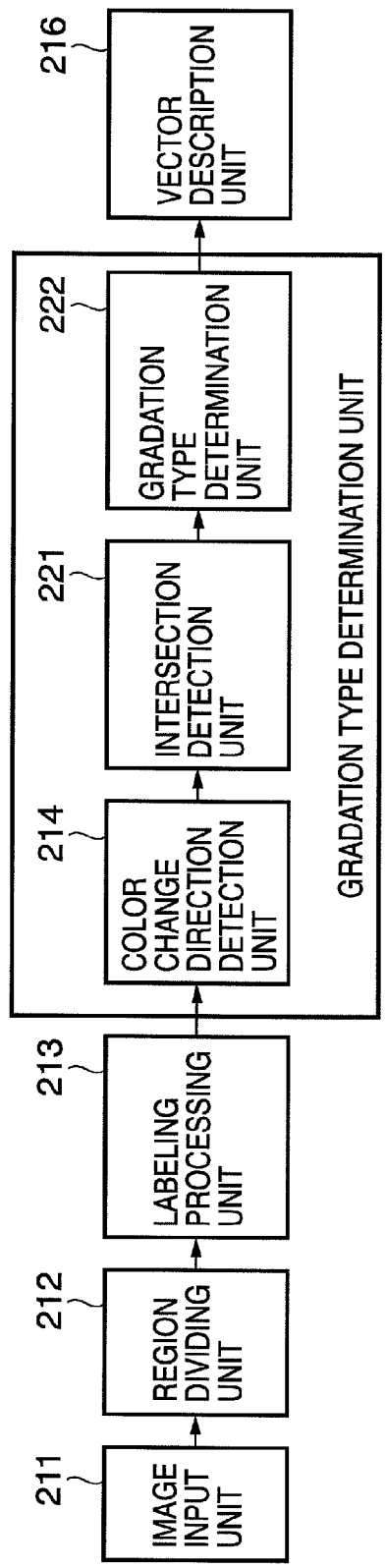
FIG. 23 is a block diagram showing the arrangement of an image processing apparatus which executes vector conversion processing of an image with gradation according to the third embodiment of the present invention.

FIG. 23 is a block diagram showing the arrangement of an image processing apparatus which executes vector conversion processing of an image with gradation according to the third embodiment of the present invention. In FIG. 23, reference numeral 211 denotes an image input unit which inputs an image to be processed; 212, a region dividing unit which divides the image into regions based on color information; 213, a labeling processing unit which separates each region into label regions; and 214, a color change direction detection unit which detects color change directions of pixels for each label region. Reference numeral 221 denotes an intersection detection unit which detects an intersection of the label region; 222, a gradation type determination unit which determines whether the gradation is linear or radial depending on the presence/absence of the intersection; and 216, a vector description unit which converts into vector data in correspondence with the gradation type.

Figure 24:
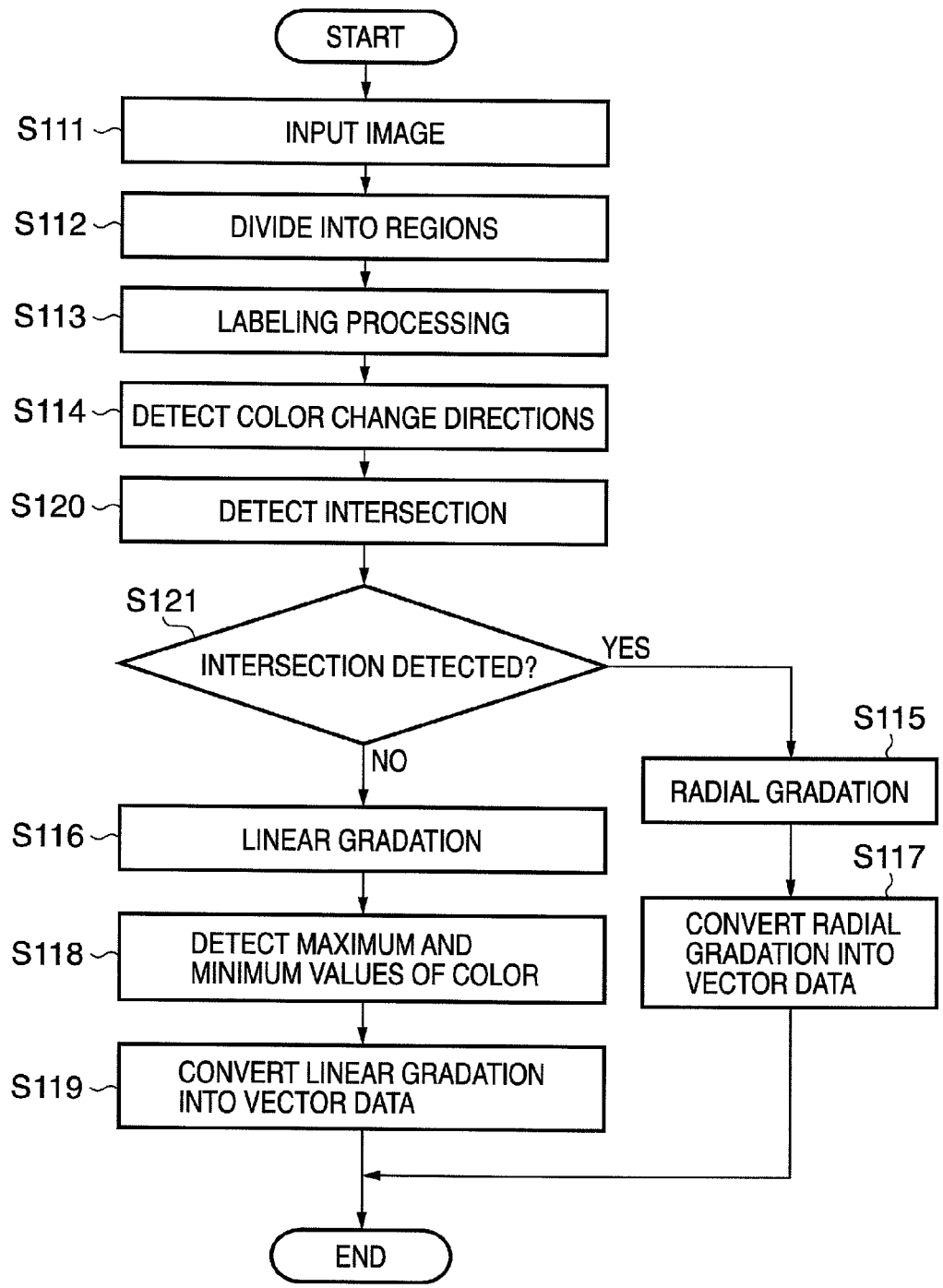
FIG. 24 is a flowchart for explaining processing according to the third embodiment of the present invention.

FIG. 24 is a flowchart for explaining the processing according to the third embodiment of the present invention. The image input unit 211 inputs an image to be processed (step S211). The region dividing unit 212 executes region dividing processing for appropriately dividing the image into regions based on color features (step S212). The labeling processing unit 213 executes labeling processing for further separating each region obtained by the region dividing processing into smaller label regions and allowing for determination of the gradation types for respective label regions (step S213). The color change direction detection unit 214 detects color change directions using color information of pixels in each label region (step S214).

The intersection detection unit 221 detects an intersection based on the color change directions of the label region (step S220). This intersection detection processing is basically the same as the aforementioned one. In this processing, however, in place of obtaining the intersection between two arbitrary direction vectors, intersections between a plurality of pairs of direction vectors must be obtained using the plurality of pairs of direction vectors. If these intersections are closer to some extent, the center of these intersections is determined to be an intersection of gradation. If these intersections are farther to some extent, it is determined that no intersection is detected.

In steps S221, S215, and S216, the gradation type determination unit 222 determines the type of gradation depending on the presence/absence of an intersection in each label region. As a result, if an intersection is found (Yes), the gradation type of the label region of interest is determined to be radial gradation (step S215). On the other hand, if an intersection is not found (No), the gradation type of the label region of interest is determined to be linear gradation (step S216).

In steps S216 to S219, the vector conversion description unit 216 describes the gradation using a vector in accordance with the gradation type of each label region. In the case of linear gradation, the maximum value and minimum value of a color located in the linear gradation region are detected (step S218), and are described by a vector of linear gradation (step S219). On the other hand, in the case of radial gradation, a vector description of the radial gradation is made (step S217).

As described above, according to the third embodiment, after an image with gradation is divided into regions, the divided regions are separated into label regions, and the color change directions of the label regions are detected. Then, it is checked if each label region has an intersection, so as to determine whether the gradation is linear or radial. A vector description is made in correspondence with the determined gradation. In this way, a gradation region approximate to an original image can be reproduced.

Fourth Embodiment

The fourth embodiment of the present invention will be described below. The second and third embodiments described above have explained the case wherein a vector description of a part determined as linear gradation is made merely as a density pattern of gradation. However, even linear gradation may include some color density patterns of linear gradation. Hence, correspondence between linear gradation and the color density patterns of gradation is finely determined, and a vector description is made in correspondence with a linear gradation pattern.

FIG. 25 is a block diagram showing the arrangement of an image processing apparatus which executes linear gradation determination processing according to the fourth embodiment of the present invention. Referring to FIG. 25, reference numeral 31 denotes a linear gradation input unit which inputs an area determined to be linear gradation; and 32, a color maximum value/minimum value detection unit which detects the maximum value and minimum value of a color located in the linear gradation to be processed. Reference numeral 33 denotes a linear gradation pattern determination unit which determines the linear gradation pattern, and reference numeral 34 denotes a vector description unit which makes a vector conversion description in correspondence with the linear gradation pattern.

Figure 26:
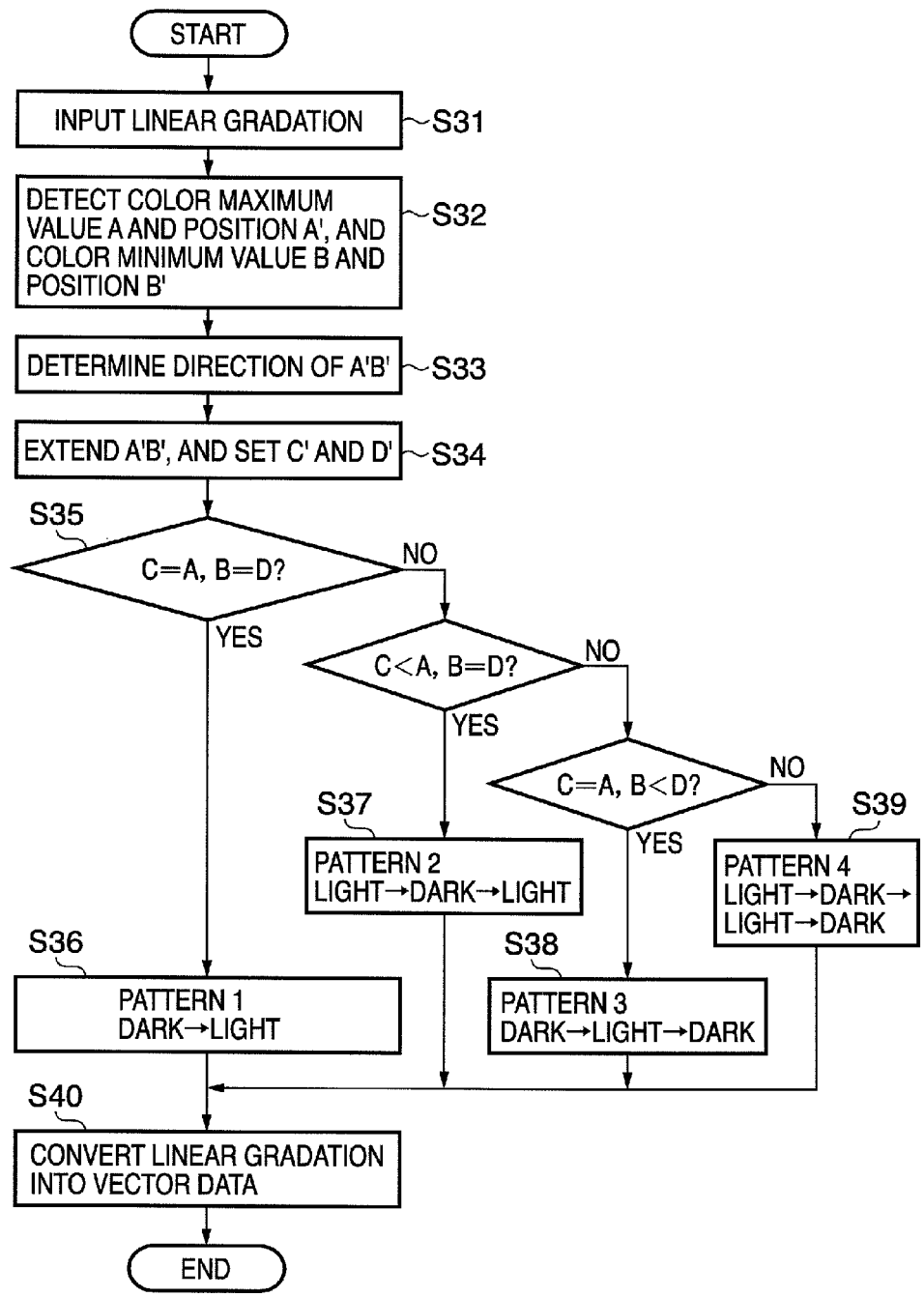
FIG. 26 is a flowchart for explaining image processing in the image processing apparatus according to the fourth embodiment of the present invention.

FIG. 26 is a flowchart for explaining image processing in the image processing apparatus according to the fourth embodiment of the present invention. The linear gradation input unit 31 inputs an area determined to be linear gradation (step S31). In steps S31 and S32, the color maximum value/minimum value detection unit 32 detects the maximum value A of a color located in the linear gradation region to be processed and its position A', and the minimum value B of that color and its position B', and determines a direction by connecting A' and B'.

In steps S33 to S39, the linear gradation pattern determination unit 33 determines the pattern of linear gradation.

Line A'B' is extended, and points C' and D' are set at appropriate positions on the extended line. The color at point C' is C, and that at point D' is D. By checking colors A, B, C, and D of A', B', C', and D', the type of linear gradation pattern is determined. If color C is the same as A and color D is the same as B, a dark→light pattern of A→B as pattern 1 is determined. For example, if color C is lighter than A, and color D is the same as B, a light→dark→light pattern of C→A→B as pattern 2 is determined. Furthermore, for example, if color C is the same as A, and color D is darker than B, a dark→light→dark pattern of A→B→D as pattern 3 is determined. Moreover, if the aforementioned conditions are not met, it is determined that color C is lighter than A and color D is darker than B, and a light→dark→light→dark pattern of C→A→B→D as pattern 4 is determined.

In step S40, the linear gradation description unit 34 describes linear gradation in accordance with the determined linear gradation pattern. FIG. 27 shows an example of the linear gradation description processing according to the fourth embodiment of the present invention.

As described above, according to the fourth embodiment, since a linear gradation pattern of the linear gradation is finely determined and described, linear gradation can be reproduced more accurately.

Other Embodiments

The preferred embodiments of the present invention have been explained, and the present invention can be practiced in the forms of a system, apparatus, method, program, storage medium (recording medium), and the like. More specifically, the present invention can be applied to either a system constituted by a plurality of devices, or an apparatus consisting of a single piece of equipment.

Note that the present invention includes the following case. That is, a program of software that implements the functions of the aforementioned embodiments (programs corresponding to the illustrated flowcharts in the above embodiments) is directly or remotely supplied to a system or apparatus. Then, the invention is achieved by reading out and executing the supplied program code by a computer of that system or apparatus.

Therefore, the program code itself installed in a computer to implement the functional processing of the present invention using the computer implements the present invention. That is, the present invention includes the computer program itself for implementing the functional processing of the present invention.

In this case, the form of the program is not particularly limited, and an object code, a program to be executed by an interpreter, script data to be supplied to an OS, and the like may be used as long as they have the program function.

A recording medium for supplying the program, for example, includes a floppy (registered trademark) disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, the program may be supplied by downloading the program from a home page on the Internet to a recording medium such as a hard disk or the like using a browser of a client computer. That is, connection to the home page is established, and the computer program itself of the present invention or a compressed file containing an automatic installation function is downloaded from the home page. Also, the program code that forms the program of the present invention may be segmented into a plurality of files, which may be downloaded from different home pages. That is, the present invention includes a WWW server which requires a plurality of users to download a program file required to implement the functional processing of the present invention by the computer.

Also, a storage medium such as a CD-ROM or the like, which stores the encrypted program of the present invention, may be delivered to the user. The user who has cleared a predetermined condition may be allowed to download key information that decrypts the encrypted program from a home page via the Internet. The encrypted program may be executed using that key information to be installed on a computer, thus implementing the present invention.

The functions of the aforementioned embodiments may be implemented by executing the readout program. In addition, the functions of the aforementioned embodiments may also be implemented by some or all of actual processing operations executed by an OS or the like running on the computer based on an instruction of that program.

Furthermore, the functions of the aforementioned embodiments can be implemented after the program read out from the recording medium is written in a memory of an expansion board or a function expansion unit which is inserted into or connected to the computer. That is, the functions of the aforementioned embodiments can also be implemented by some or all of actual processes executed by a CPU or the like arranged in the function expansion board or unit based on the instruction of that program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-095840, filed Mar. 30, 2006 which is hereby incorporated by reference herein in its entirety.

What is claimed is:

1. An image processing method in an image processing apparatus for converting a gradation image into vector data, the method comprising:
a color change direction detecting step of detecting color change directions of pixels in the gradation image;
a gradation type determining step of determining gradation type of the gradation image as linear gradation when the color change directions detected in the color change direction detecting step agree with an identical direction; and a description step of describing the gradation image using a graphic language in accordance with the determined gradation type.

2. The method according to claim 1, wherein the gradation type determining step determines the gradation type of the gradation image as the linear gradation when the color change directions agree with the identical direction, and determines the gradation type of the gradation image as radial gradation when the color change directions do not agree with the identical direction.

3. The method according to claim 1, further comprising
a labeling step of labeling the gradation image to obtain label regions,
and wherein the color change direction detecting step detects the color change directions of pixels for each of the label regions obtained in the labeling step.

4. The method according to claim 1, further comprising:
a color maximum value/minimum value detecting step of detecting a maximum value and a minimum value of a color in the gradation image determined as the linear gradation in the gradation type determining step; and
a linear gradation pattern determining step of determining a density pattern of the color of the linear gradation based on color values of two pixels located on a straight line including a first pixel position where the detected maximum value of the color is located, and a second pixel position where the minimum value is located.

5. An image processing method in an image processing apparatus for converting a gradation image into vector data, the method comprising:
a color change direction detecting step of detecting color change directions of pixels in the gradation image;
an intersection detecting step of detecting an intersection of direction vectors of the color change directions;
a gradation type determining step of determining gradation type of the gradation image as radial gradation when the intersection of the direction vectors is detected; and
a description step of describing the gradation image using a graphic language in accordance with the determined gradation type.

6. The method according to claim 5, wherein the gradation type determining step determines the gradation type of the gradation image as the radial gradation when the intersection of the direction vectors is detected, and determines the gradation type of the gradation image as linear gradation when the intersection of the direction vectors is not detected.

7. The method according to claim 5, further comprising
a labeling step of labeling the gradation image to obtain label regions,
and wherein the color change direction detecting step detects the color change directions of pixels for each of the label regions obtained in the labeling step.

8. The method according to claim 5, wherein the intersection detecting step comprises:
a barycenter detecting step of detecting a barycenter of a region of pixels having the same direction vector;
a vector extracting step of a direction vector from the barycenter as a representative vector of the region;
an inter-vector intersection detecting step of detecting an intersection between arbitrary two direction vectors; and
a gradation intersection detecting step of determining, when the intersection between the two direction vectors falls within a predetermined distance range, that a gradation intersection is present in the region, and determining the intersection as a gradation intersection.

9. A non-transitory computer-readable storage medium storing an executable program for making a computer execute an image processing method according to claim 1.

10. A non-transitory computer-readable storage medium storing an executable program for making a computer execute an image processing method according to claim 5.

11. An image processing apparatus for converting a gradation image into vector data, the apparatus comprising:
a color change direction detecting unit adapted to detect color change directions of pixels in the gradation image;
a gradation type determining unit adapted to determine gradation types of the gradation image as linear gradation when the color change directions detected by the color change direction detecting unit agree with an identical direction; and
a description unit adapted to describe the gradation image using a graphic language in accordance with the determined gradation type.

12. The apparatus according to claim 11, wherein the gradation type determining unit determines the gradation type of the gradation image as the linear gradation when the color change directions agree with the identical direction, and determines the gradation type of the gradation image as radial gradation when the color change directions do not agree with the identical direction.

13. An image processing apparatus for converting a gradation image into vector data, the apparatus comprising:
a color change direction detecting unit adapted to detect color change directions of pixels in the gradation image;
an intersection detecting unit adapted to detect an intersection of direction vectors of the color change directions;
a gradation type determining unit adapted to determine gradation type of the gradation image as radial gradation when the intersection of the direction vectors is detected by the intersection detecting unit; and
a description unit adapted to describe the gradation image using a graphic language in accordance with the determined gradation type.

14. The apparatus according to claim 13, wherein the gradation type determining unit determines the gradation type of the gradation image as the radial gradation when the intersection of the direction vectors is detected, and determines the gradation type of the gradation image as linear gradation when the intersection of the direction vectors is not detected.

* * * * *